US011209528B2

(12) United States Patent
Mathy et al.

(10) Patent No.: US 11,209,528 B2
(45) Date of Patent: Dec. 28, 2021

(54) TIME-OF-FLIGHT DEPTH IMAGE PROCESSING SYSTEMS AND METHODS

(71) Applicant: Analog Devices, Inc., Norwood, MA (US)

(72) Inventors: Charles Mathy, Arlington, MA (US); Nicolas Le Dortz, Cambridge, MA (US); Richard Haltmaier, Andover, MA (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 16/160,723

(22) Filed: Oct. 15, 2018

(65) Prior Publication Data

US 2019/0113606 A1  Apr. 18, 2019

Related U.S. Application Data

(60) Provisional application No. 62/572,520, filed on Oct. 15, 2017.

(51) Int. Cl.
*G06K 9/40* (2006.01)
*G01S 7/4865* (2020.01)
(Continued)

(52) U.S. Cl.
CPC ............ *G01S 7/4866* (2013.01); *G01S 17/10* (2013.01); *G01S 17/894* (2020.01); *G06T 7/13* (2017.01);
(Continued)

(58) Field of Classification Search
CPC ........ G01S 7/4866; G01S 17/10; G01S 17/89; G06T 7/13; H04N 13/128; H04N 13/254; H04N 13/271; H04N 5/23241
(Continued)

(56) References Cited

U.S. PATENT DOCUMENTS 6,496,598 B1  12/2002 Harman
8,587,583 B2  11/2013 Newcombe et al.
(Continued)

FOREIGN PATENT DOCUMENTS

CN    102014293    4/2011
CN    102385237    3/2012
(Continued)

OTHER PUBLICATIONS

Marin et al., *Reliable Fusion of ToF and Stereo Depth Driven by Confidence Measures*, European Conference on Computer Vision (ECCV), Oct. 16, 2016, 16 pages.
(Continued)

*Primary Examiner* — Stephen P Coleman
(74) *Attorney, Agent, or Firm* — Patent Capital Group

(57) ABSTRACT

Time of Flight (ToF) depth image processing methods. Depth edge preserving filters are disclosed with superior performance to standard edge preserving filters applied to depth maps. In particular, depth variance is estimated and used to filter while preserving depth edges. In doing so, filter strength is calculated which can be used as an edge detector. A confidence map is generated with low confidence at pixels straddling a depth edge, and which reflects the reliability of the depth measurement at each pixel.

21 Claims, 13 Drawing Sheets

(51) Int. Cl.
*H04N 13/254* (2018.01)
*G01S 17/894* (2020.01)
*G06T 7/13* (2017.01)
*H04N 13/128* (2018.01)
*H04N 13/271* (2018.01)
*G01S 17/10* (2020.01)
*H04N 5/232* (2006.01)
*H04N 5/225* (2006.01)

(52) U.S. Cl.
CPC ....... *H04N 5/23241* (2013.01); *H04N 13/128* (2018.05); *H04N 13/254* (2018.05); *H04N 13/271* (2018.05); *G06T 2207/10028* (2013.01); *H04N 5/2256* (2013.01)

(58) Field of Classification Search
USPC ........................................................ 382/260
See application file for complete search history.

(56) References Cited

U.S. PATENT DOCUMENTS

| | | | |
|---|---|---|---|
| 10,055,657 | B2 | 8/2018 | Fang et al. |
| 2006/0018507 | A1 | 1/2006 | Rodriguez et al. |
| 2007/0024614 | A1* | 2/2007 | Tam ................. H04N 13/261 345/419 |
| 2009/0033760 | A1* | 2/2009 | Oh ................... H04N 5/23293 348/222.1 |
| 2011/0096832 | A1 | 4/2011 | Ying et al. |
| 2012/0002863 | A1* | 1/2012 | Lim ................... H04N 13/106 382/154 |
| 2012/0051631 | A1* | 3/2012 | Nguyen ................ G06K 9/38 382/164 |
| 2012/0056982 | A1 | 3/2012 | Katz et al. |
| 2012/0127270 | A1 | 5/2012 | Ying et al. |
| 2012/0162363 | A1 | 6/2012 | Huang et al. |
| 2012/0274634 | A1* | 11/2012 | Yamada ............. G06K 9/00362 345/419 |
| 2013/0016900 | A1 | 1/2013 | Kim et al. |
| 2013/0022111 | A1 | 1/2013 | Chen et al. |
| 2013/0156332 | A1* | 6/2013 | Tian ................... H04N 7/148 382/232 |
| 2013/0215233 | A1 | 8/2013 | Wang et al. |
| 2013/0250053 | A1 | 9/2013 | Levy |
| 2013/0257851 | A1 | 10/2013 | Lee et al. |
| 2013/0329066 | A1 | 12/2013 | Zhou et al. |
| 2014/0023292 | A1* | 1/2014 | Yamada ............... H04N 5/2628 382/289 |
| 2014/0055560 | A1* | 2/2014 | Fu ........................ G06T 5/005 348/42 |
| 2014/0104274 | A1* | 4/2014 | Hilliges ................. G06F 3/011 345/424 |
| 2014/0253688 | A1 | 9/2014 | Metz et al. |
| 2014/0267631 | A1 | 9/2014 | Powers et al. |
| 2014/0354775 | A1* | 12/2014 | Barsoum ................ G01S 17/89 348/46 |
| 2015/0016713 | A1 | 1/2015 | Mori et al. |
| 2015/0030232 | A1 | 1/2015 | Parkhomenko et al. |
| 2015/0049169 | A1 | 2/2015 | Krig et al. |
| 2015/0130908 | A1 | 5/2015 | Kang et al. |
| 2015/0281618 | A1* | 10/2015 | Saito ...................... H04N 9/31 348/303 |
| 2016/0077206 | A1 | 3/2016 | Dokmanic et al. |
| 2017/0127048 | A1* | 5/2017 | Nobayashi ............ G06T 7/0002 |
| 2017/0195654 | A1 | 7/2017 | Powers et al. |
| 2017/0216626 | A1* | 8/2017 | Berlinger ................ G06T 7/521 |
| 2017/0272651 | A1* | 9/2017 | Mathy ................... G01S 7/4868 |
| 2017/0374269 | A1 | 12/2017 | Govindarao et al. |
| 2018/0309970 | A1 | 10/2018 | Gupta et al. |

FOREIGN PATENT DOCUMENTS

| | | |
|---|---|---|
| CN | 102622776 | 8/2012 |
| CN | 106144816 | 11/2016 |
| JP | 2013/509104 | 3/2013 |
| JP | 2013/545200 | 12/2013 |
| JP | 2015/019204 | 1/2015 |
| WO | 2014/120613 | 8/2014 |

OTHER PUBLICATIONS

International Search Report and Written Opinion issued in PCT/US2018/055907 dated Feb. 8, 2019, 15 pages.
Non-Final Office Action issued in U.S. Appl. No. 15/458,536 dated Mar. 17, 2020, 14 pages.
Achuta Kadambi et al., Polarized 3D: High-Quality Depth Sensing with Polarization Cues, MIT Media Lab, Int'l Conf. on Computer Vision (ICCV) Technical paper submission, 2015, http://web.media.mit.edu/~achoo/polar3D.
English Translation (Google) of the Bibliographic Data, Description and Claims for CN102014293A.

* cited by examiner

TIME-OF-FLIGHT DEPTH IMAGE PROCESSING SYSTEMS AND METHODS

RELATED APPLICATIONS

This application receives benefit from and/or claims priority to U.S. Provisional Patent Application Ser. No. 62/572,520 filed on Oct. 15, 2017, entitled, "TIME-OF-FLIGHT DEPTH IMAGE PROCESSING SYSTEMS AND METHODS". This application is also related to U.S. patent application Ser. No. 15/458,536 entitled, "REDUCING POWER CONSUMPTION FOR TIME-OF-FLIGHT DEPTH IMAGING," both applications are hereby incorporated by reference in their entirety.

FIELD OF THE DISCLOSURE

The present disclosure pertains to time of flight (ToF) depth imaging. More specifically, this disclosure describes systems and techniques relating to novel digital filters and ToF depth image maps for processing thereof.

BACKGROUND

Time of flight (ToF) is a property of an object, particle or acoustic, electromagnetic or other wave. It is the time that such an object needs to travel a distance through a medium. The measurement of this time (i.e. the time of flight) can be used for a time standard (such as an atomic fountain), as a way to measure velocity or path length through a given medium, or as a way to learn about the particle or medium (such as composition or flow rate). The traveling object may be detected directly (e.g., ion detector in mass spectrometry) or indirectly (e.g., light scattered from an object in laser doppler velocimetry).

The Time-of-Flight principle (ToF) is a method for measuring the distance between a sensor and an object based on the time difference between the emission of a signal and its return to the sensor after being reflected by an object. Various types of signals (also called carriers) can be used with ToF, the most common being sound and light. Some sensors use light as their carrier because it is uniquely able to combine speed, range, low weight and eye-safety. Infrared light can ensure less signal disturbance and easier distinction from natural ambient light resulting in the higher performing sensors for a given size and weight.

A time-of-flight camera (ToF camera) is a range imaging camera system that resolves distance based on the known speed of light, measuring the time-of-flight of a light signal between the camera and the subject for each point of the image.

In time-of-flight (ToF) image sensors, the image sensor captures a two-dimensional image, or several two-dimensional images, from which a processor can determine the distance to objects in the scene. The TOF image sensor is further equipped with a light source that illuminates objects whose distances from the device are to be measured by detecting the time it takes the emitted light to return to the image sensor. The system may also utilize image processing techniques.

Filters are routinely applied to regular images. However, the inventors of the present disclosure have recognized the need for filters specifically designed for TOF sensors.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Time of Flight (ToF) depth image processing methods. Depth edge preserving filters are disclosed. Specifically, filters inspired by bilateral and guided filters are utilized as a function of depth. In particular, depth variance is estimated and used to filter while preserving depth edge. In doing so, filter strength is calculated which can be used as an edge detector.

According to one aspect, the present disclosure is a depth edge preserving filter used in time of flight depth image processing. According to another aspect, the depth edge preserving filter is a bilateral filter. According to another aspect, the bilateral filter is based upon a depth estimate, at least in part. According to one aspect, the disclosure is a calculated sum of weights. According to another aspect, the calculated sum of weights is used to perform depth edge detection. According to yet another aspect, the present disclosure is a depth edge preserving filter used in time of flight depth image processing. According to another aspect, the depth edge preserving filter is a filter inspired by a guided filter. According to another aspect, the filter is based upon a depth estimate, at least in part. According to another aspect, the filter is based upon an estimated depth variance, at least in part.

According to one aspect, an image processing filter that preserves edge depth comprises a light source configured to emit light during a first time interval, an image sensor for collecting incoming signals including reflected light comprising a plurality of pixels, wherein for each of the plurality of pixels, the image sensor includes a set of storage units for storing collected signals, a programmable timing generator configured to control the light source and the image sensor, and determine measurements performed and stored at each storage unit of the set of storage units, and a processor configured to utilize stored collected signals from the storage units, and determine a distance measurement at each of the plurality of pixels.

According to some implementations, the processor is further configured to determine a depth variance measurement at each of the plurality of pixels. In some implementations, the processor is further configured to determine the depth variance measurement at each of the plurality of pixels by performing a depth calculation at each of the plurality of pixels, and calculating the variance of the depth calculation for a set of pixels around each pixel of the plurality of pixels. In some configurations, the processor is further configured to determine an estimate of expected variance at each of the plurality of pixels.

In some implementations, the processor is configured to use an error model to determine the estimate of expected variance from the correct depth at each of the plurality of pixels. In some examples, the processor is further configured to use the measurements stored in each of the storage units to determine the estimate of expected variance at each of the plurality of pixels. In some examples, the processor is further configured to use the measurements stored in each of the storage units and temperature measurements, to determine an estimate of expected variance at each of the plurality of pixels. In some implementations, the processor is configured to apply a spatial filter to the measurements stored in each of the storage units, generating spatially filtered measurements. In some examples, the processor is further configured to use the spatially filtered measurements and the error model to determine the estimate of expected variance at each of the plurality of pixels.

According to some implementations, the image processing filter further comprises a depth edge filter configured to perform depth edge preserving filtering for each of the set storage units, wherein a first set of weights is applied to each of the set of storage units. According to some implementations, each of the set of storage units comprises a plurality of frames, and the image processing filter further comprises a depth edge filter configured to perform depth edge preserving filtering of each of the plurality of frames for each of the set storage units wherein a first set of weights is applied to each of the set of storage units. In some examples, the processor is configured to use a local measurement of variance and the estimate of expected variance for depth edge preserving filtering.

According to some implementation, the filter is configured to replace a value of each storage unit with a sum of values of each storage unit. In some examples, the filter is configured to replace a value of each storage unit with a sum of values of each storage unit for pixels contributing to the filtered value around the filtered pixel multiplied by weights that depend on the location of each pixel contributing to the filtered value and on the estimated depth at each pixel.

In some implementations, the weights spatially decay exponentially away from the filtered pixel with a spatial variance, and the weights decay exponentially with the difference between the depth at the pixels contributing to the filtered value and the depth at the given pixel with a variance given by the local estimate of expected variance.

In some implementations, the weights spatially decay exponentially away from a filtered pixel for the respective storage unit with a spatial variance. In some examples, the weights decay exponentially with the difference between the depth at the pixels contributing to the filtered value and the depth at the given pixel with a variance given by the local estimate of variance.

According to some implementations, the filter used is a filter where each storage unit value is replaced by the storage unit value multiplied by a constant A and added to a constant B, where A is a pixel dependent sum of the cross correlations of the depth and the values in the storage units divided by the sum of the cross correlations of the depth and the values in the storage units plus a constant, and B is a pixel dependent constant dependent on the storage unit whose value is chosen to preserve the average value of the storage units before and after filtering. In some examples, the pixel dependent constant a is spatially filtered.

In various implementations, the filter is a bilateral filter in space and depth with weights that depend on both the distance between the pixel being filtered and the pixel contributing to the filtered value, and on the measured depth difference between the pixel being filtered and the pixel contributing to the filtered value. In some examples, the depth variance measurement is spatially varying and a local depth variance is an expected variance obtained from an error model. In some configurations, each storage unit value in the filter is replaced by the storage unit value multiplied by a constant A and added to a constant B, where a is the sum of the cross correlations of the depth and the values in the storage units divided by the sum of the cross correlations of the depth and the values in the storage units plus a constant.

In some implementations, the filter is a bilateral filter in space and depth, wherein a local depth variance measurement is a variance measured from a set of pixels around a first pixel.

In some implementations, the filter is a bilateral filter in space and depth, where the decay of the filter as a function of the difference in depth estimate between a filtered pixel and a pixel contributing to the filtered value is such that features of a fixed size are preserved at all distances.

In one implementation, the filter comprises a depth edge detector for the plurality of pixels, wherein the depth edge detector detects depth edges in regions where the filter is filtering weakly.

In various configurations, the processor determines the regions where the filter is filtering weakly by summing weights of the filter and, when the sum of the weights falls below a threshold, determining a proximity to an edge.

According to some implementations, the depth edge detector is configured to detect regions where the depth edge is filtering weakly by summing the weights of the filter and ascertaining the presence of edges when the sum of the weights falls below a certain threshold. In some implementations, the depth edge detector is configured to detect regions where the filter is filtering weakly by detecting pixels where a contribution to a filtered pixel value from a respective unfiltered pixel value of the pixel being filtered is above a threshold. In some examples, pixels where filtering is weak are pixels where a depth edge is likely to be present.

According to some implementations, the filter further comprises a confidence map for the plurality of pixels wherein the confidence map includes a value for each of the plurality of pixels indicating a reliability of a distance measurement for the respective pixel, and wherein the reliability is based at least in part on the depth variance measurement for the respective pixel.

In some configurations, the confidence map is configured to use the result of depth detection to indicate that pixels close to an edge have relatively low confidence. In some examples, the confidence map is configured to use a variance estimate at each pixel to generate a confidence value, wherein a confidence value decreases with increasing variance estimate. In some examples, the confidence map is configured to use a relative variance estimate at each pixel to generate a confidence value away from edges that decreases with increasing variance estimate.

According to one aspect, a method for determining edge depth in an image comprises emitting light during a first time interval, collecting incoming signals including reflected emitted light, determining a depth estimate for a plurality of pixels from unfiltered collected incoming signals, determining an estimate of standard deviation of depth for each of the plurality of pixels, and determining, for each of the plurality of pixels, based at least in part on the estimate of standard deviation of depth, whether a respective pixel represents an edge.

According to some implementations, the method further includes, when the respective pixel represents an edge, filtering the respective pixel weakly. In some implementations, the method further includes filtering strongly when the respective pixel does not represent an edge.

According to some implementations, the method further includes producing a confidence map for the plurality of pixels wherein the confidence map includes a value for each pixel indicating a reliability of the depth estimate for the respective pixel, and wherein the reliability is based at least in part on the estimate of standard deviation of depth for the respective pixel.

In some implementations, determining an estimate of standard deviation for a first pixel comprises determining a standard deviation of the depth estimate for each of a set of pixels from the plurality of pixels, wherein the set of pixels comprises pixels located around the first pixel. In some implementations, determining an estimate of standard deviation of the depth for each of the plurality of pixels comprises deriving standard deviation estimates from noise characteristics of the system.

According to some implementations, the method further includes, for a first pixel, providing a plurality of storage units, wherein each of the plurality of storage units stores a portion of the collected incoming signals for the first pixel, averaging values over a series of frames to determine a value of each of the plurality of storage units, and determining a standard deviation of each of a plurality of storage units. In some examples, the method includes determining a standard deviation of the depth of the first pixel as a function of the standard deviations of each of the plurality of storage units using error propagation.

According to another aspect, an image processing filter that preserves edge depth comprises a light source configured to emit light during a first time interval, an image sensor for collecting incoming signals including reflected light comprising a plurality of pixels, wherein for each of the plurality of pixels, the image sensor includes a set of storage units for storing collected signals, a programmable timing generator configured to control the light source and the image sensor, means for determining measurements performed and stored at each storage unit of the set of storage units, and means for utilizing stored collected signals from the storage units, and determining a distance measurement at each of the plurality of pixels.

In some examples, the filter further comprises a confidence map for the plurality of pixels. The confidence map includes a value for each of the plurality of pixels indicating a reliability of a distance measurement for the respective pixel, and the reliability is based at least in part on the depth variance measurement for the respective pixel.

The drawings show exemplary ToF circuits, systems and configurations. Variations of these systems, for example, changing the positions of, adding, or removing certain elements from the circuits are not beyond the scope of the present invention. The illustrated ToF devices and configurations are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

The present disclosure pertains to time of flight (ToF) depth imaging. More specifically, this disclosure describes systems and techniques relating to novel digital filters and ToF depth image maps for processing thereof. In particular, the present disclosure contemplates the use of novel bilateral and guided filters to attain superior ToF depth imaging.

Edge detection plays an important role in image processing area. Recently, the use of bilateral filters applied to image arrays have attained increasing popularity. The present disclosure presents weighted edge detection and a method based on bilateral filtering which achieves better performance than single Gaussian filtering or previous bilateral filters. In this form of filtering, both spatial closeness and intensity similarity of pixels are considered in order to preserve important visual features provided by edges and reduce the sharpness of transitions in intensity values as well.

However, the current state of the art uses intensity weighting as the basis for its edge detection and smoothing. The inventors of the present disclosure have discovered a method using depth (distance) for use in filtering. The inventors have recognized that intensity and weighted pixel distance have several shortcomings. Specifically, in ToF depth imaging, flat surfaces which have high contrast area (e.g., checkerboard) will present edges at the intensity interfaces.

Nevertheless, this is not very useful in 3-d imaging because it is the depth edge which is valuable. As such, disclosed herein are several methods for implementing depth edge preserving filters which mitigate noise in depth estimates while preserving depth edges. In addition to the depth edge preserving filters method proposed in this disclosure, a depth edge detector is achieved using filtering weights calculated during filtering.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Time of flight imager arrays emit and collect light. ToF imager arrays convert light hitting a sensor into charge that is stored in different storage units at each pixel, from which the ToF imager arrays infer the distance of objects in the scene. The stored charge may be amplified before readout. The readout can be converted into a number proportional to number of received photons.

Figure 1:
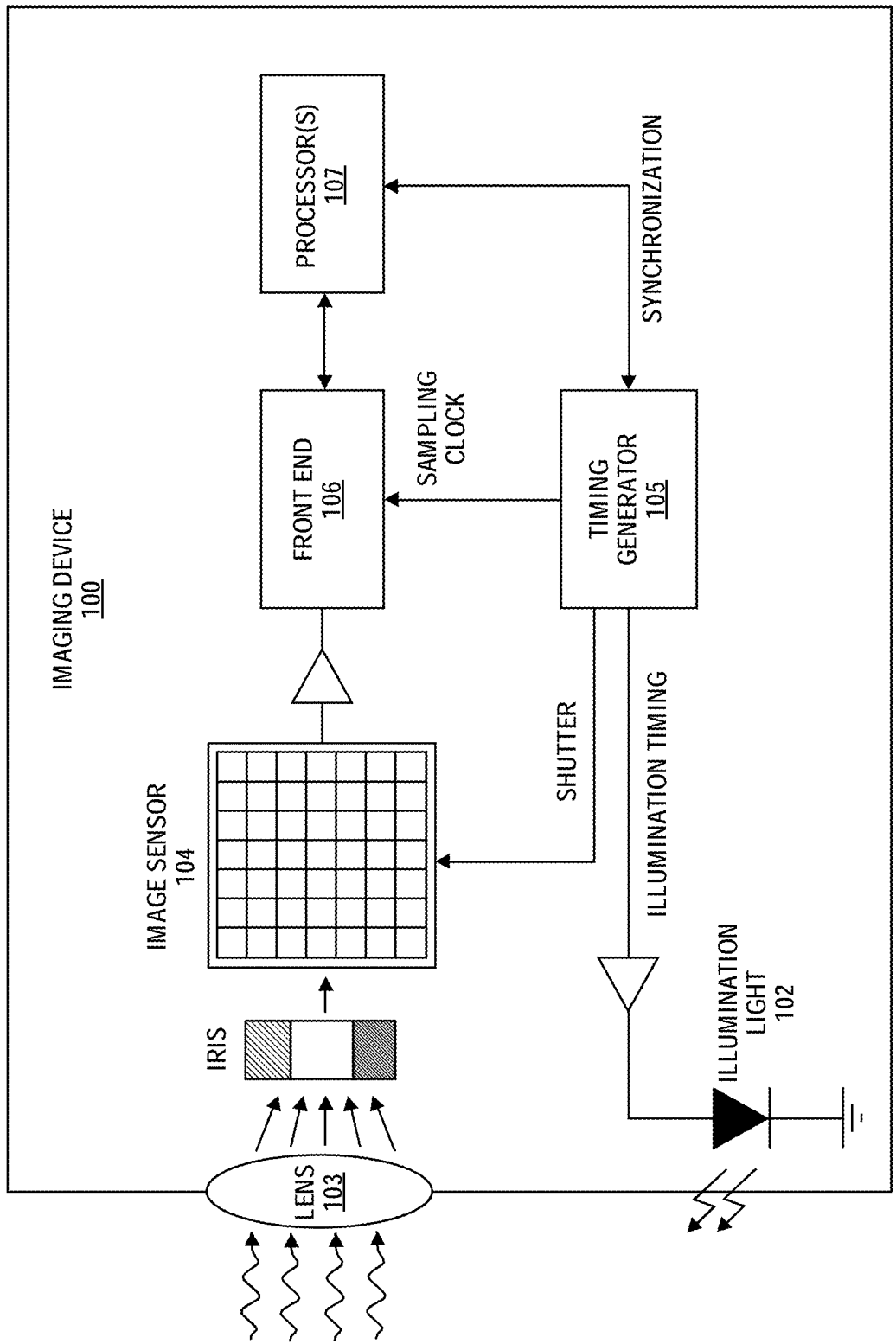
FIG. 1 shows an imaging device, according to some embodiments of the disclosure.

FIG. 1 shows the components in an exemplary imaging device 100 capable of forming an image of the distance to objects in the scene, according to various aspects of the invention. An illumination light source 102 emits light, which reflects off objects in the scene. In some examples, the light frequency is an infrared frequency to reduce the contribution from sunlight. Some of the reflected light enters the lens 103 in front of the image sensor 104. A timing generator 105 sends signals to the light source which controls the amount of light being emitted. The timing generator 105 also sends signals to the image sensor 104. The signals to the image sensor 104 from the timing generator 105 are used to determine the sensitivity of the image sensor 104. The sensitivity of the image sensor 104 dictates how much charge the sensor 104 generates per unit of incoming light. In particular, the sensor 104 has a set of charge storage units at each pixel and as it collects signal it can add that signal to one of its storage units. A front end 106 reads out the contents of each storage unit and converts them to a number. A processor 107 performs the computations on the storage units that lead to a distance measurement at each pixel.

Figure 2:
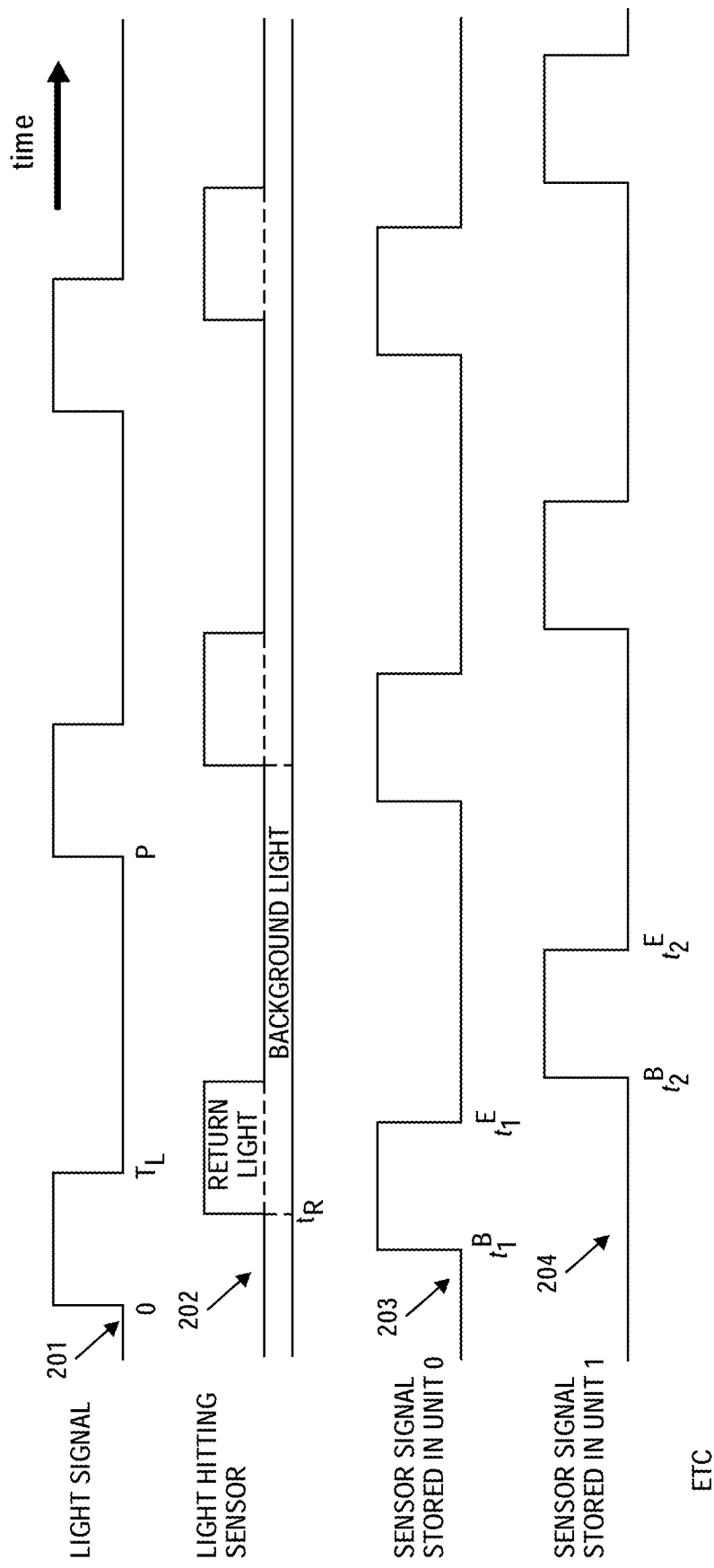
FIG. 2 shows an example of signals generated by a timing generator, according to some embodiments of the disclosure.

FIG. 2 shows an example of signals generated by the timing generator 105, according to various aspects of the invention. The higher the signal from the timing generator 105 to the light source 102, the more light is output by the light source 102. The amount of light power emitted by the light source as a function of time is represented as L(t), and depends on the signal sent by the timing generator to the light source. L(t) may also depend on other parameters such as the temperature of the light source. In the first signal line 201, the light signal is on from time t=0 to time $t=T_L$, and the light source 102 is emitting light from time t=0 to time $t=T_L$. The light from the light source 102 will bounce off objects in the scene, and return with a time delay $t_R$ for each pixel, as shown in the second line 202. The delay $t_R$ for each pixel determines the distance D to the object in the pixel according to $$D = \frac{ct_R}{2} \quad (1)$$

where c is the speed of light.

The timing generator 105 also sends signals to the image sensor 104 that determine the sensitivity λ(t) of the image sensor 104 as a function of time. The light power hitting the sensor 104 as a function of time is represented as R(t), and the charge collected by the sensor 104 is: ∫λ(t)R(t)dt. The light power hitting the sensor may take the form R(t)=a L(t−$t_R$)+b, where a is a constant that depends on the reflectivity of the target; $t_R$ is the time it takes for the light to leave the sensor, bounce of the object at the given pixel and return to the sensor; and b is the contribution from other light sources such as sunlight. At each pixel the sensor may obtain an approximation to $t_R$, from which the distance d to the object may be obtained according to $$d = \frac{ct_R}{2}.$$

In some implementations, the sensor sensitivity λ(t) as a function of time can be approximated as being either a positive constant when the sensor is collecting light and therefore on, or 0 when the sensor is not collecting light and therefore off. The sensor signal may have two signal levels, where one signal level corresponds to the sensor being off, and one signal level corresponds to the sensor being on. The third signal line 203 shows the time the image sensor 104 is turned on. In particular, the image sensor 104 is on for a fixed time interval from $t=t_1^B$ to $t_1^E$, and off otherwise. In some implementations, the on/off state of the image sensor 104 is determined by signals received at the image sensor 104 from the timing generator 105. According to various implementations, the light signals from the timing generator 105 and sensor signals from the timing generator 105 can be repeated a number of times with a time period P, to increase the signal strength and reduce the noise of the measurement.

The fourth signal line 204 shows the time sensor is on for a signal that is collecting in a second storage unit of the image sensor 104. In particular, the second storage unit of the image sensor 104 is on for a fixed time interval from $t=t_2^B$ to $t_2^E$, and off otherwise.

The light that arrives at the sensor 104 is a combination of the light leaving the light source 102 and reflecting off objects on the scene, and background light. In various examples, background light comes from sunlight and/or other light sources.

Figure 3:
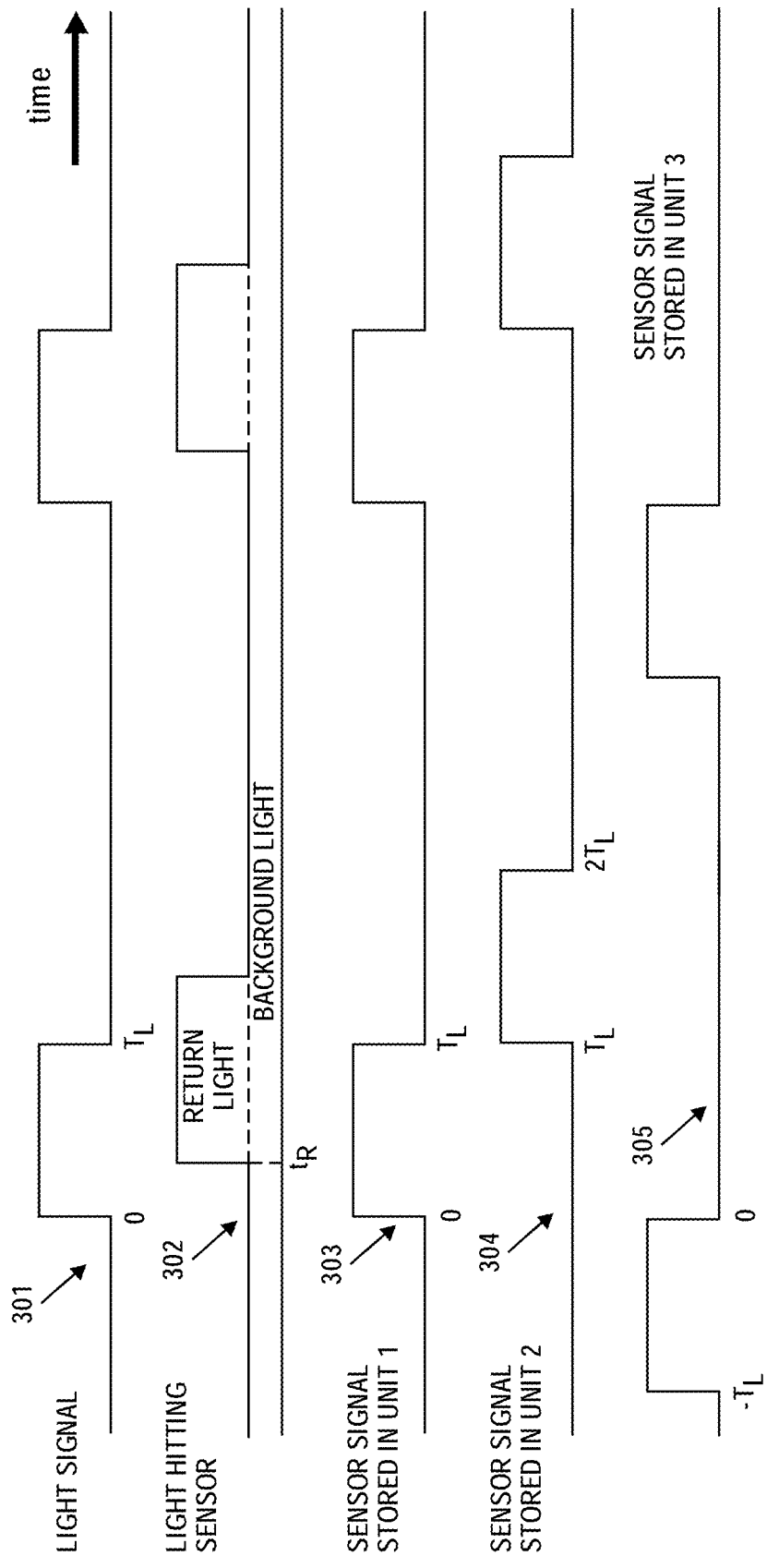
FIG. 3 shows an example scheme for determining an image of distances, according to some embodiments of the disclosure.

In some implementations, the light output power L(t) as a function of time can be approximated as being either a nonzero value L when light source is on, or 0 when light source is off. The light signal may have two signals levels, where one signal level corresponds to the light source being on, and one signal level corresponds to the light source being off. According to one implementation, a scheme that obtains an image of distances subtracts the contribution from background light. FIG. 3 shows one example scheme that results in an image of distances, according to various implementations of the invention. As shown in FIG. 3, to produce an image of distances, there are three storage units per pixel. As shown in the signal line 301, the light source 102 is on from time t=0 to $T_L$. The storage unit 1 in the sensor 104, shown in line 303, is on and collecting return light from time t=0 to $T_L$. This is repeated N times, and the resulting stored value is $S_0$. The storage unit 2 in the sensor 104, shown in line 304, is on and collecting return light from time $t=T_L$ to $2T_L$. This is repeated N times and the resulting value is called $S_1$. The storage unit 3 in the sensor 104, shown in line 305, is turned on for a time interval $T_L$ in a time where no emitted light is received, thus receiving only background light. This is repeated N times and the result is called $S_2$. In one example, the storage unit 3 is turned on and collecting light from time $t=-T_L$ to time t=0. If the light pulse is perfectly square, then the sensor sensitivity is perfectly square, and the depth D can be determined using equation (2):

$$D = \frac{cT_L}{2} \frac{S_1 - S_2}{S_1 + S_0 - 2S_2} \quad (2)$$

where c is the speed of light. Note that the sensor sensitivity corresponds to how much charge the sensor 104 generates per unit of incoming light power.

There can be different equations for depth depending on what the storage units collect exactly, but the result is a depth equation that depends on the values at the storage units. In some implementations, there are 3 storage units per pixel. In other implementations, there are more than 3 storage units per pixel, and in other implementations there are fewer than 3 storage units per pixel.

Figure 4:
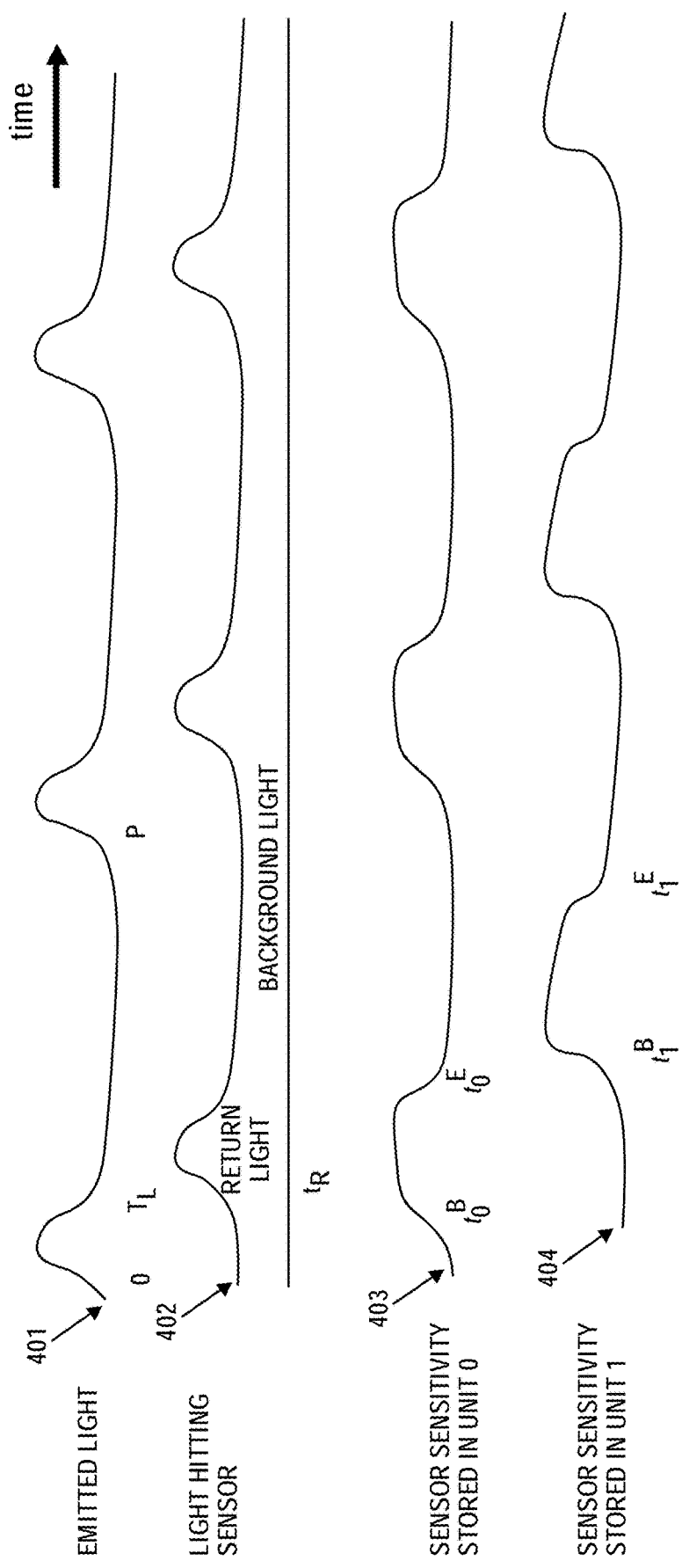
FIG. 4 shows an example of light emitted by a light source overtime, and sensitivity of a sensor over time, according to some embodiments of the disclosure.

Additionally, hardware limitations may prevent having perfectly square pulses, as there may be rise and fall times. The output power of the light source 102 may depend on the strength of the input signal to the light source 102. Similarly, the sensitivity of the sensor 104 may depend on the strength of the input signal to the sensor 104. FIG. 4 shows examples of what the light hitting the sensor and the sensor sensitivities over time may actually look like for a scheme where the timing generator is programmed to generate signals approximately as shown in FIG. 3. Thus, equation (2) depends nonlinearly on the depth. Its dependence may be learned beforehand and stored in a lookup table H(x). The lookup table H(x) outputs the depth D when the setting $$x = \frac{S_1 - S_2}{S_1 + S_0 - 2S_2}:$$

$$D = H\left(\frac{S_1 - S_2}{S_1 + S_0 - 2S_2}\right) \quad (3)$$

In some implementations, there are a different number of repetitions $N_i$ for each storage unit $S_i$. For example, at short distances $S_1$ is smaller than $S_0$. As an object gets more distant from the sensor, both $S_0$ and $S_1$ typically decrease, as the light reflecting off objects is generally emitted in all directions, leading to the amount of return light decreasing quadratically with distance. Therefore, if the number of repetitions is chosen to obtain a certain signal level, the number of repetitions $N_1$ for S can be chosen to be larger than the number of repetitions $N_0$ for $S_0$. In some examples, the number of repetitions $N_2$ for $S_2$ can be chosen to be larger than both $N_0$ and $N_1$ to obtain a less noisy measurement of $S_2$. For example, if the background signal is relatively small, the number of repetitions $N_2$ for $S_2$ can be chosen to be larger than both $N_0$ and $N_1$ to obtain a less noisy measurement of $S_2$. In other cases, $N_2$ can be chosen to be smaller than $N_0$ and $N_1$ if it is determined that the contribution from noise in the background measurement is small enough for a smaller $N_2$. For the case of different repetition rates, $S_i$ in (2) and (3) can be replaced by $$\frac{N_0}{N_1}S_1,$$

and $S_2$ by $$\frac{N_0}{N_2}S_2,$$

and the equations hold. Equation (3) becomes:

$$D = H\left(\frac{\frac{N_0}{N_1}S_1 - \frac{N_0}{N_2}S_2}{\frac{N_0}{N_1}S_1 + S_0 - 2\frac{N_0}{N_2}S_2}\right) \quad (4)$$

Similarly, the equivalent of equation (2) with unequal pulse counts can be obtained by setting $$H(x) = x\frac{cT}{2}.$$

Figure 5:
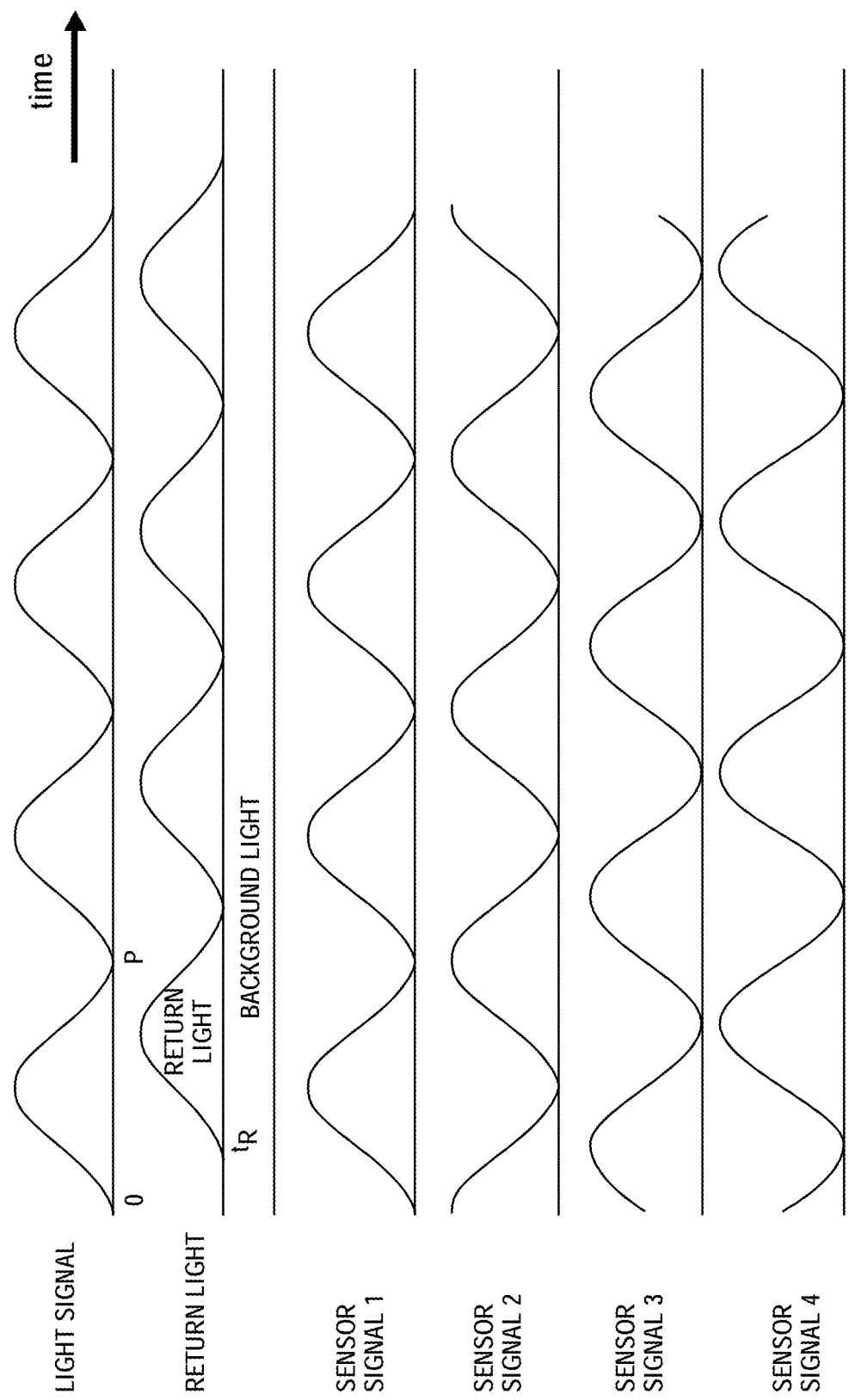
FIG. 5 shows an example scheme for determining an image of distances, according to some embodiments of the disclosure.
Figure 6:
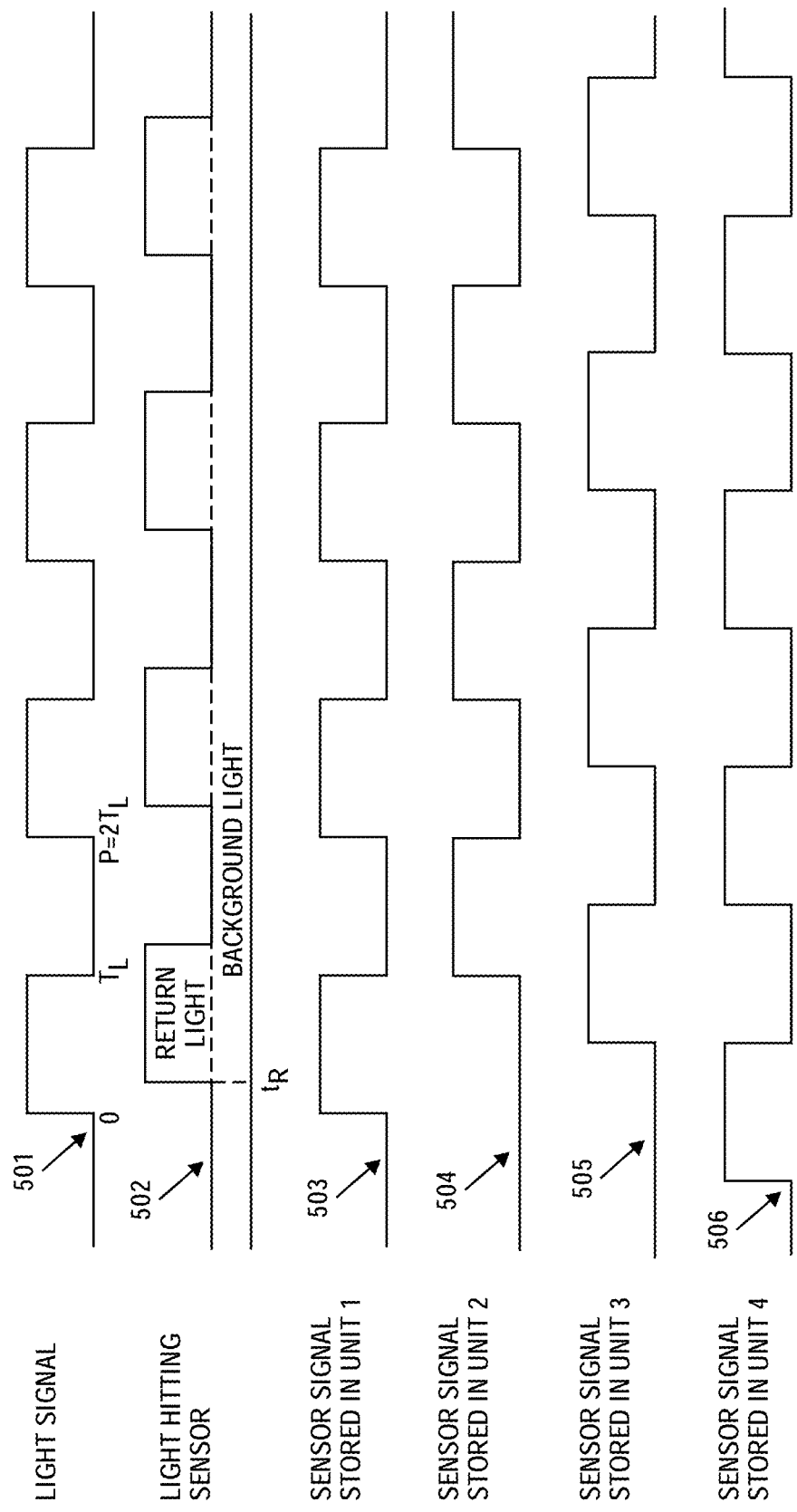
FIG. 6 shows an example scheme for determining an image of distances, according to some embodiments of the disclosure.

FIG. 5 shows another example scheme to obtain depth, according to various implementations of the invention. In the scheme shown in FIG. 5, there are four storage units per pixel. The light signal and the sensor signal vary sinusoidally over time. The light output power L(t) is given by equation (5):

$$L(t) = \frac{A_L}{2}\left(-\cos\left(\frac{2\pi t}{P}\right) + 1\right) \quad (5)$$

which denotes a sinusoidally varying light output power with period P, where $\lambda_L$ denotes the maximum light output power for this light emission function. The sensor sensitivity overtime may depend on a number denoted by the phase φ of the measurement, and be given by:

$$\lambda_\phi(t) = \frac{A_S}{2} \times \left(-\cos\left(\frac{2\pi t}{P} + \phi\right) + 1\right) \quad (6)$$

where $A_S$ denotes the maximum sensor sensitivity for this sensor sensitivity function. A single measurement with phase φ is denoted as M(φ).

The light R(t) hitting the sensor is given by equation (7):

$$R(t) = a\frac{A_L}{2}\left(-\cos\left(\frac{2\pi(t - t_R)}{P}\right) + 1\right) + b \quad (7)$$

where a depends on the reflectivity of the object in the scene, and b is the contribution from other light sources.

A single measurement with phase φ is given by equation (8):

$$M(\phi) = \int_0^P \lambda_\phi(t)R(t)dt = \frac{PA_SA_La}{8}\cos\left(\phi + \frac{2\pi t_R}{P}\right) + P\frac{A_S}{2}\left(\frac{aA_L}{2} + b\right). \quad (8)$$

Defining $S_0 = N_0 M(0)$, $S_1 = N_1 M(\pi)$, $$S_2 = N_2 M\left(\frac{\pi}{2}\right), S_3 = N_3 M\left(\frac{3\pi}{2}\right)$$

where $N_i$ is the number of repetitions of the measurement stored in storage unit $S_i$, it follows:

$$\frac{\frac{N_0}{N_2}S_2 - \frac{N_0}{N_3}S_3}{\frac{N_0}{N_1}S_1 - S_0} = \tan\left(\frac{2\pi t_R}{P}\right) \quad (9)$$

Depth can then be determined using the following equation (10):

$$D = \frac{c}{2}\frac{P}{2\pi}\arctan\left(\frac{\frac{N_0}{N_2}S_2 - \frac{N_0}{N_3}S_3}{\frac{N_0}{N_1}S_1 - S_0}\right) \quad (10)$$

However, this scheme does not distinguish between D and $$D + \frac{cP}{2}.$$

The sensor can be used to unambiguously determine depth between 0 and $$\frac{cP}{2}.$$

If the light source and the sensor sensitivity are not truly sinusoidal, a lookup table H(x) can be learned and applied to $$\left( \frac{\frac{N_0}{N_2}S_2 - \frac{N_0}{N_3}S_3}{\frac{N_0}{N_1}S_1 - S_0} \right),$$

such that $$D = H\left( \frac{\frac{N_0}{N_2}S_2 - \frac{N_0}{N_3}S_3}{\frac{N_0}{N_1}S_1 - S_0} \right) \qquad (11)$$

However, this scheme does not distinguish between D and $$D + \frac{cP}{2},$$

which limits the unambiguous camera range to be between 0 and $$\frac{cP}{2}.$$

The case of perfectly sinusoidal signals is a special case of equation (11), in which:

$$H(x) = \frac{c}{2}\frac{P}{2\pi}\arctan(x) \qquad (12)$$

There are many possible schemes that involves measurements with more storage units $S_i$. In some examples, schemes with more storage units $S_i$ cancel out higher order harmonics in the final measurement, thus making the lookup table more linear. In general, the schemes described have the form of equation (13):

$$D = H\left( \frac{\sum_i a_i S_i}{\sum_i b_i S_i} \right) \qquad (13)$$

for a set of parameters $a_i$ and $b_i$ and a lookup table H(x).

In some examples, the parameters are chosen to reduce the dependence on background light, and such that the quantity $$\frac{\sum_i a_i S_i}{\sum_i b_i S_i}$$

depends monotonically on depth. If the quantity $$\frac{\sum_i a_i S_i}{\sum_i b_i S_i}$$

does not depend monotonically on depth, then other quantities of the same form, $$\frac{\sum_i c_i S_i}{\sum_i d_i S_i}$$

for a set of parameters $a_i$ and $b_i$, may be measured and computed as well, such that a lookup table $$H\left( \frac{\sum_i a_i S_i}{\sum_i b_i S_i}, \frac{\sum_i c_i S_i}{\sum_i d_i S_i} \right)$$

can be created. The lookup table can be created if the set of quantities uniquely determine the depth. In one example, the quantities have a low dependence on background light. In the various implementations, the number of repetitions $N_i$ for each storage unit $S_i$ can be different if, in the depth equation, $S_i$ is replaced by $$\frac{N_0}{N_i}S_i.$$

In some implementations, N storage units $S_i$ are not used, such as when the equation for depth depends on N measurements $S_i$. For example, some additions may be done directly in hardware. If a quantity $\Sigma a_i S_i$ appears in a quantity and the $a_i$ are positive, then the measurement can be carried out by measuring $S_i$ and collecting it $a_i$ times, and storing the result in a single storage unit. If the $a_i$ are not integers, then $\Sigma a_i S_i$ can be multiplied by a number M such that $Ma_i$ can be approximated to the nearest integer, and the desired result can be obtained by computing:

$$\frac{1}{M} \times (\text{repeat } S_i \text{ measurement } Ma_i \text{ times and collect in one storage unit})$$

If some $a_i$ are negative, then the measurement may also be possible in hardware by using differential measurements. If multiple depth frames are obtained with the depth imager on a static scene, the depth measurements will be different due to noise sources such as circuit noise, and photon shot noise in the different storage units $S_i$. To remedy the depth measurement differences, an approach to filtering is disclosed that reduces the noise.

A desired feature of filters for a depth imager is that the filter preserves depth edges. Also, pixels that straddle a depth edge collect light from one side of the edge as well as the other, so the pixels that straddle a depth edge give erroneous depth estimates. For examples, if one side of the edge is at 1 m distance, and the other side at 2 m distance, a pixel straddling the depth edge might report a distance of 1.5 m. Thus, systems and methods are provided for determining which pixels are straddling edges so the camera can report that these pixels may give erroneous depth estimates. Additionally, systems and methods are provided for determining and reporting the reliability of estimates for pixels away from edges, and providing a confidence map.

One of the challenges with traditional filtering for a depth imager is that the imager effectively stores a set of images $S_i$. Using conventional depth preserving filtering techniques for each image $S_i$ independently, such as bilateral or guided filtering can lead to unacceptable distortions of the depth map. In particular, an edge preserving filter filters heavily away from edges and filters less around edges to preserve the edge. An edge may be more pronounced in one of the images $S_i$ than another image $S_j$. The edge preserving filter may use a different set of filtering weights in $S_i$ when it gets close to the edge than in $S_j$. Thus, in conventional edge filtering, the resulting distance estimate may be completely off, as the combination of pixels contributing to $S_i$ may be different than the combination of pixels contributing to $S_j$. Thus, systems and methods are provided herein for ensuring that the weights are consistent across the images $S_i$.

Traditional edge preserving filtering methods such as bilateral and guided filters can be applied directly to the depth map, thus reducing some of the noise while preserving depth edge filters. However, filtering the storage units directly may give a far larger reduction in noise, as the noise in the depth equation will include contributions from noise from all the storage units. In some cases filtering the storage units before applying the depth equation may significantly enhance the reduction of noise. After a depth is obtained from filtered values of the storage units, further filtering steps may be applied on the depth map such as guided and/or bilateral filtering.

In practice, noise coming for example from shot noise, noise due to background light, thermal noise, and dark currents are unwanted artifacts of the imaging process as they affect depth measurement. By way of example, if the imaging process experiment is repeated several times, the depths measurements will be different due to shot noise in $S_0$, $S_1$, and $S_2$ because depth measurements are a function of a plurality of values disposed in the storage units.

Shot noise or Poisson noise is a type of noise which can be modeled by a Poisson process. In electronics, shot noise originates from the discrete nature of electric charge. As in the present disclosure, shot noise occurs in photon counting in optical devices, where shot noise is associated with the particle nature of light. Therefore, photon shot noise is an inescapable source of noise. As the photons are converted to electrons with a certain quantum efficiency, the photon shot noise will lead to electron shot noise. Further manipulation of the electrons in the hardware may lead to increase in shot noise. The hardware may also add thermal noise and dark current noise to the measurements. The variance of shot noise grows with the signal level, which means the amount of noise may vary strongly across a scene when objects of different reflectivities and distances are present.

To mitigate noise among phases and achieve better depth resolution, a novel approach to filtering is disclosed. An object of the present disclosure is to filter image frames while not filtering across depth edges so as to preserve the depth edges.

Figure 7:
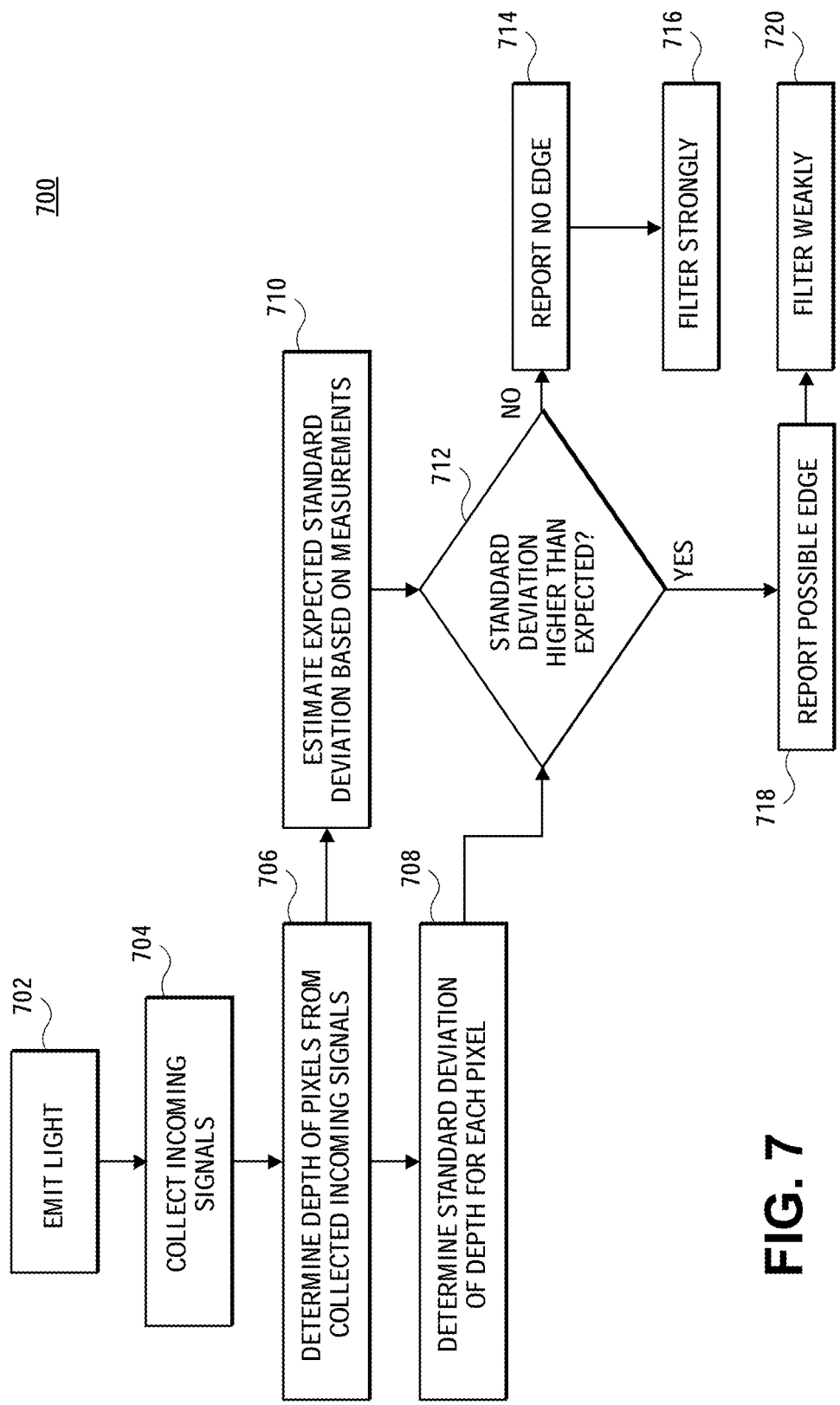
FIG. 7 shows a method for depth imaging, according to some embodiments of the disclosure.

FIG. 7 shows a method 700 for edge detection for depth image processing, according to various implementations. At step 702, light is emitted from a light source. At step 704, incoming light signals are collected at an image sensor. The incoming light signals may include reflected emitted light and background light. At step 706, a depth measurement is determined for each pixel in the image sensor, based on the collected incoming light signals. At step 708, a standard deviation of the depth measurement is determined for each pixel, as described in greater detail below. At step 710, the expected standard deviation is calculated based on the measurements at the pixel and a model of the noise, as described in greater detail below.

At step 712 the standard deviation is evaluated to determine whether the standard deviation measurement is high or not, based on the expected standard deviation according to an error model. If the standard deviation is not high compared to what is expected according to some comparison criterion, the system may report that the pixel does not represent an edge (step 714). If filtering is on, then in step 716 the filter will be set to filter strongly around the pixel if it is not an edge. If the standard deviation is high compared to what is expected, then the system may report that the pixel may be close to an edge (step 718). If filtering is on then the filter should be set to filter weakly so as to preserve the depth edge (step 720). The confidence at each pixel is an estimate of the reliability of the depth estimate at that pixel. If the standard deviation is high, the pixel may represent an edge, and at step 716, the confidence for the pixel is revised, as described in greater detail below. The system may report a number representing the strength of the edge around the pixel, instead of simply a binary number reporting that there is an edge or there is not an edge. The measured variance is compared to an expected variance, because a region of low reflectivity will naturally have a larger depth variance so that the return signal is low and therefore the noise is higher. Thus, an estimated variance is used to avoid misinterpreting low reflectivity as the presence of an edge.

Filters

Systems and methods are provided for filters that are guided by depth and jointly filter the different storage units, with consistent weights across the filters. This ensures consistent filters and avoids adding spurious features to the depth. To that end, an estimate of the depth is obtained from the unfiltered data. For example, in one scheme described above we use equation (2). Once depth is determined, an estimate of the standard deviation of the depth is determined.

The standard deviation of the depth around a pixel can be calculated, for example by selecting a set of pixels around a given pixel and calculating the standard deviation of the unfiltered depth estimates for the pixels around the given pixel.

The expected standard deviation at a pixel can furthermore also be estimated based on the measurement at the pixel and a model of the noise characteristics of the system. First the standard deviation of each storage unit $S_i$ is determined by studying the different noise sources in the system, such as dark current, thermal noise, and shot noise. Once the standard deviation of the storage units is known, the standard deviation of the depth can be determined from the equation which determines depth as a function of the storage units $S_i$, for example using error propagation. Given the function $F(S_i)$ that takes the storage units $S_i$ as inputs and outputs the depth D, the variance $\sigma_D^2$ in D can in some cases be adequately approximated by equation (14):

$$\sigma_D^2 = \sum_{i=0}^{N-1} \left(\frac{\partial F}{\partial Si}\right)^2 \sigma_{S_i}^2 + G(T, N_i, \ldots) \qquad (14)$$

where $G(T, N_i, \ldots)$ contains the contribution to the variance from sources such as thermal noise, and dark current, which depends on the amount of time the sensor is on and therefore on the repetition numbers $N_i$ of the measurements.

For example, if shot noise is the dominant noise source, then the variance of the storage units $S_i$ is given by equation (15):

$$\sigma_{S_i}^2 = \alpha <S_i> \quad (15)$$

where $\alpha$ is a constant, and $<S_i>$ is the mean value of $S_i$ at that pixel, which would be obtained by collecting several frames of a given scene and averaging the result for each storage unit.

In some examples, only one frame is provided, and $<S_i>$ is approximated to be the value $S_i$ obtained at that frame. Alternatively, $S_i$ can be spatially filtered and the filtered $S_i$ can be used. For the case of FIG. 2, the variance of the depth is approximately given by $$\sigma_D^2 = \quad (16)$$

$$\alpha \left( \frac{x(1-x)}{I}\left(1 + \frac{N_1 - N_0}{N_0}x\right) + \frac{S_2}{I^2}\left(\frac{x^2 N_1}{N_0 N_2}(4N_1(N_2 + N_0) + N_2 N_0) - \frac{2DN_1}{N_2}\left(\frac{2N_1 + N_2}{N_2}\right) + \frac{N_1}{N_2^2}(N_1 + N_2)\right)\right) H'(x)$$

where $$x = \frac{(S1 - S2)}{(S1 + S0 - 2S2)}, H'(x)$$

is the derivative of H at x, and $I = S_0 + S_1 - 2S_2$.

In case of perfectly square pulses the same equation holds with $$H(x) = \left(\frac{cT}{2}\right)^2 x.$$

I is the intensity and is proportional to the light source output power, thus increasing the output power reduces the variance as expected.

In some cases, approximations or special cases of this equation are used. For example, if the contribution from the background measurement $S_2$ is small enough according to an error tolerance to be negligible, then the equation simplifies to equation (17):

$$\sigma_D^2 = \alpha \frac{x(1-x)}{I}\left(1 + \frac{N_1 - N_0}{N_0}x\right) H'(x) \quad (17)$$

Further simplification could be justified, for example if the camera is being used for a range of distances for which $x(1-x) H'(x)$ can be approximated as a constant $$\frac{cT}{2},$$

then $$\sigma_D^2 = \alpha \frac{1}{I}\left(1 + \frac{N_1 - N_0}{N_0}x\right)\frac{cT}{2} \quad (18)$$

Finally, if $N_1$ and $N_0$ are either equal or close enough to each other, then $$\sigma_D^2 = \alpha \frac{1}{I}\frac{cT}{2} \quad (19)$$

For the case of equation (11), assuming shot noise is the dominant noise source, define $$I_1 = \frac{N_0}{N_2}S_2 - \frac{N_0}{N_3}S_3, I_2 = S_0 - \frac{N_0}{N_1}S_1, \text{ then } D = H\left(\frac{I_1}{I_2}\right), \quad (20)$$

$$\text{and } \sigma_D^2 = \frac{\alpha}{I_2^4}\left(I_1^2\left(S_0 + \left(\frac{N_0}{N_1}\right)^2 S_1\right) + I_2^2\left(\left(\frac{N_0}{N_2}\right)^2 S_2 + \left(\frac{N_0}{N_3}\right)^2 S_3\right)\right) H'\left(\frac{I_1}{I_2}\right)$$

The assumption in the above variance equations was that shot noise is the dominant noise source, but if there are other noise sources that cannot be ignored or dominate altogether then one can derive the noise equations as a function of the values stored at each pixel. For example, if other terms contribute to the variance $\sigma_{S_i}^2$, equation (14) can be used with a different equation for $\sigma_{S_i}^2 = \alpha <S_i>$. For example, a dark current would contribute a constant to the variance: $\sigma_{S_i}^2 = \alpha <S_i> + \beta N_i$, where $\beta$ is a constant and $\beta N_i$ is the dark current contribution. If there is thermal noise a constant would be added that depends on temperature.

In some implementations, contributions from systematic offsets are added to the equation for the variance $\sigma_D^2$ of the depth. These contributions may be added if, for example, there are variations from pixel to pixel such that two pixels looking at an object at the same distance may give slightly different numbers, or if the lookup tables are only known to some accuracy. In that case, a term $(\sigma_D^2)_{systematic}$ is added to $\sigma_D^2$. Such a term may depend on depth and/or the values $S_i$ in the storage units, and possibly other parameters such as temperature of the different parts of the system. The variance is then understood to be the deviation from the correct depth.

For the equation to be exact, the values of $S_i$ used are their mean values, obtained by averaging over a series of frames. The coordinates (i,j) are used to refer to pixel at row i, column j. The means at a pixel (i,j) can be approximated by their value at one frame, or a spatially filtered value around (i,j) such as the output of a median filter or Gaussian filter.

Once the estimate of local variance is determined, it is used to devise filters that use the local estimate of variance. $S_k(i,j)$ is defined as the value of storage unit k at pixel (i,j). Filtered values of $S_k(i,j)$, which we will refer to as $S_k^F(i,j)$ are determined. $\sigma_D(i,j)$ is the estimate of the expected depth variation at pixel (i,j), obtained, for example, from an error model. The values of $S_k^F(i,j)$ depend on pixels near pixel (i,j). The position of a pixel closeby is $(i_n, j_n)$.

According to various implementations:

If $|D(i_n,j_n) - D(i,j)|/\sigma_D(i,j)$ is large, $S_k(i_n,j_n)$ has a relatively small contribution to $S_k^F(i,j)$ If $|D(i_n,j_n) - D(i,j)|/\sigma_D(i,j)$ is small, $S_k(i_n,j_n)$ has a relatively large contribution to $S_k^F(i,j)$ In some configurations, one can replace the variance estimate with another function of depth. Alternatively one could choose a constant that does not depend on depth. Such changes will affect which edges will be smoothed over and which will be preserved.

In one example, consider $S_k^F(i,j)$ to be a linearly weighted combination of $S(i_n,j_n)$, where $(i_n,j_n)$ now run over the pixels that contribute to $S_k^F(i,j)$, then:

$$S_k^F(i,j) = \Sigma_{(i_n,j_n)} w_k(i,j,i_n,j_n,D(i,j),D(i_n,j_n)) S_k(i_n,j_n) \quad (21)$$

where $w_k(i,j,i_n,j_n,D(i,j),D(i_n,j_n))$ is the weight indicating how much pixel $(i_n,j_n)$ contributes to the filtered values at pixel $(i,j)$.

If $|D(i_n,j_n)-D(i,j)|/\sigma_D(i,j)$ is large, then $w_k(i,j,i_n,j_n, D(i,j), D(i_n,j_n))$ should be small. Additionally, the sum:

$$\Sigma_{(i_n,j_n)} w(i,j,i_n,j_n,D(i,j),D(i_n,j_n)) = 1 \qquad (22)$$

so that a pixel is replaced by a weighted sum of pixels, and the weights sum to one.

As a concrete example, consider the following form for the weights:

$$w_k(i, j, i_n, j_n, D(i, j), D(i_n, j_n)) = \qquad (23)$$
$$\frac{1}{N(i, j)} f_s(i, j, i_n, j_n) f_D(D(i, j), D(i_n, j_n))$$

where $f_s(i,j,i_n,j_n)$ is a function that depends only on the positions of the pixels, and $f_D(D(i,j),D(i_n,j_n))$ depends on the depths at pixel $(i,j)$ and at pixel $(i_n,j_n)$. $N(i,j)$ is chosen such that $\Sigma_{(i_n,j_n)} w(i,j,i_n,j_n) = 1$.

One example for $f_s(i,j,i_n,j_n)$ and $f_D(D(i,j), D(i_n,j_n))$ is:

$$f_s(i, j, i_n, j_n) = \exp\left(-\frac{(i-i_n)^2 - (j-j_n)^2}{A\sigma_S^2(i, j)}\right) \qquad (24)$$

$$f_D(D(i, j), D(i_n, j_n)) = \exp\left(-\frac{(D(i, j) - D(i_n, j_n))^2}{B\sigma_{D(i,j)}^2}\right) \qquad (25)$$

where A and B are constants. This filter will preserve depth edges. In some cases $\sigma_S^2(i,j)$ is independent of i and j, and simply equal to a constant.

In some cases, $$f_D(D(i, j), D(i_n, j_n)) = \exp\left(-\frac{(D(i, j) - D(i_n, j_n))^2}{B\sigma_{D(i,j)}^2}\right)$$

is approximated by a simpler function to forego having to compute the exponential which can be computationally expensive. For example, $$\frac{(D(i, j) - D(i_n, j_n))^2}{B\sigma_{D(i,j)}^2}$$

can be calculated and a set of increasing values $A_i$ and decreasing values $B_i$ can be stored, such that if $$\frac{(D(i, j) - D(i_n, j_n))^2}{B\sigma_{D(i,j)}^2}$$

falls between $A_i$ and $A_{i+1}$, the exponential is approximated to be the value $$B_i = \exp\left(-\frac{A_i + A_{i+1}}{2}\right)$$

which can be precomputed. In other words the exponential can be approximated with a lookup table.

In some cases, the strength of the filter depends on depth in some specific fashion. In that case, the aggressiveness of the filter depends on depth. This can be achieved by generalizing the above equation. For example, depth dependence can be added to $f_s$ and replaced with:

$$f_S(i, j, i_n, j_n, D(i, j)) = \exp\left(-\frac{(i-i_n)^2 - (j-j_n)^2}{g_S(i, j, D(i, j))}\right) \qquad (26)$$

where $g_s(i,j, D(i,j))$ is a function that depends on depth as well as position. For example, if $g_s(i,j, D(i,j))=A\,D(i,j)^\alpha$ where A and $\alpha$ are constant, for $\alpha>0$ the filter will be more aggressive at long distances, while for $\alpha<0$ the filter will be more aggressive at short distances.

In some examples, features of a fixed size are preserved. For example, features having a size of a centimeter are preserved. For different depths the number of pixels corresponding to the minimum feature size to be preserved will change: at 1 m for example, if a pixel collects light over a square of size 1 mm by 1 mm, then at 2 m the pixel collects light over a square of size 2 mm by 2 mm. Therefore, to preserve features of a given size $g_s(i,j, D(i,j))=A/D(i,j)^2$, so in the previous notation $\alpha=-2$.

In some implementations, $f_D$ can be modified:

$$f_D(D(i, j), D(i_n, j_n)) = \exp\left(-\frac{(D(i, j) - D(i_n, j_n))^2}{Bg_D(D(i, j))}\right) \qquad (27)$$

where $g_D(D)$ is a function of depth that need not be an estimate of variance, and B is a constant. If $g_D(D)$ increases with depth the filter gets more aggressive at large distances, and if it decreases with distance the filter gets more aggressive at short distances.

Another example of filter on the storage units that preserves depth edges is $$S_k^F(i, j) = a(i, j)D(i, j) + b_k \qquad (28)$$

where $$a(i, j) = \frac{\left(\sum_k \sum_{(i_n,j_n)} D(i_n, j_n)(S_k(i_n, j_n) - <S_k>)\right)}{(\sum_k \sum_{(i_n,j_n)} D(i_n, j_n)(D(i_n, j_n) - <D>)) + \epsilon} \qquad (29)$$

$$b_k = <S_k> - a(i, j)<D> \qquad (30)$$

where $$<D> = \frac{1}{N_n} \sum_{(i_n,j_n)} D(i_n, j_n)$$

is the mean of D over the pixels $(i_n,j_n)$ close to $(i,j)$ that are contributing to the filtering of pixel $(i,j)$. $N_n$ is the number of pixels contributing to the filtering of pixel $(i,j)$. Similarly $$<S_k> = \frac{1}{N_n} \sum_{(i_n,j_n)} S_k(i_n, j_n).$$

$b_k$ is chosen so that the mean is preserved: $<S_k^F>=<S_k>$

If $a(i,j)$ is large then the contributions to $S_k^F(i,j)$ are dominated by the unfiltered $D(i,j)$, which means that the filter is proportional to unfiltered depth values, and therefore filtering less. Conversely, if a(i,j) is small the filtering is stronger. E is a constant: if E is large then a(i,j) is smaller, and the filtering is more aggressive. If E is small then a(i,j) is larger and the filtering is less aggressive.

Consider an edge in depth in the set of pixels being evaluated. If D and $S_k$ are strongly correlated then $\Sigma_{(i_n,j_n)}D(i_n,j_n)(S_k(i_n,j_n)-\langle S_k\rangle)$ is large, so a(i,j) is large. Thus, if for example there is a depth edge in D and in $S_k$, then the filter will preserve that edge. Therefore, this is another example of a depth edge preserving filter.

To make the filter smoother, a low pass filtering step can be applied to a(i,j), thus getting $a_{LP}(i,j)$. This still preserves depth edges because a(i,j) varies relatively smoothly, even across a depth edge (it will be small around the edge). Then the following equation (31) can be applied:

$$S_k^F(i,j)=a_{LP}(i,j)D(i,j)+b_k \quad (31)$$

Depth edge preserving filters can be used to obtain estimates of where the depth edges are. If $|S_k^F(i,j)-S_k(i,j)|$ is large the filter filters strongly at position (i,j) which suggests there is no depth edge, while if $|S_k^F(i,j)-S_k(i,j)|$ is small there is likely a depth edge. For example, in the first filter discussed:

$$w_k(i, j, i_n, j_n, D(i, j), D(i_n, j_n)) = \quad (32)$$
$$\frac{1}{N(i, j)} f_S(i, j, i_n, j_n) f_D(D(i, j), D(i_n, j_n))$$

Then if N(i,j) is larger this means that the sum of the weights is large, and therefore the weights did not decay quickly. If the weights did not decay quickly, it filtered heavily, meaning that the spatially extent of the filtering region was large, and there was no depth edge. Thus N(i,j) acts as a depth edge detector: wherever it is small there are edges. For the second filter example, where $$S_k^F(i,j)=a_{LP}(i,j)D(i,j)+b_k \quad (33)$$

$a_{LP}(i,j)$ is large where the filter is aggressive, and small where it is less aggressive, which is where there are edges. Thus $a_{LP}(i,j)$ also can be used as a depth edge detector. If it falls below a threshold, the pixel is considered to be at a depth edge. The threshold can be tuned to detect edges of a certain strength, for example edges where the depth jumps by a certain amount.

The idea underlying the depth edge detectors is that a pixel is considered part of an edge if the variance around that pixel is larger than is expected from the values stored in the local storage units. Thus, a depth edge detector can also be obtained by measuring the local variance of depth in the set of pixels around the given pixel, dividing this measured local variance by the local estimate $\sigma_D$ of depth variance, and if that quantity exceeds a threshold asserting that the pixel is a depth edge pixel. In other embodiments the quantity is used as a nonbinary estimate of the strength of a depth edge close to the pixel.

The depth edge detector can then be used to report the pixels that are straddling a depth edge, and therefore whose depth estimates should not be trusted, as they may be giving a depth that is in between the depth on either side of the edge, when there is no object at that depth. Thus, this yields a map of the pixels whose reported depth cannot be trusted. From this a confidence map can be constructed:

$C_{depth\ edge}(i,j)=0$ if pixel(i,j) is at a depth edge, 1 otherwise  (34)

The confidence based on estimate of depth edges can also be nonbinary, resulting in a number that is larger the stronger the edge around a given pixel is. An edge is stronger if the difference in depth between the two sides of the edge is larger. Then $C_{depth\ edge}(i,j)$ is a positive number that is larger the stronger a depth edge is.

Since an estimate of the local variance of the depth was calculated, for the remaining pixels, the estimated depth variance can be reported, which gives a measure of the confidence of each pixel. A confidence map typically reports a number such that if the confidence is high, the depth estimate at the pixel should be considered reliable, and if the confidence is low, the depth estimate should be considered unreliable. One possible confidence map would be to assign a confidence of zero for the pixels where the depth edge detector has crossed a certain threshold. For the remaining pixels, the variance is estimated, and a number of the form $$C_{noise}=\max(\min((-A\sigma_D+B),1),0) \quad (35)$$

In words, a confidence number proportional and negatively related to the standard deviation is output, with a minimum value of 0 and a maximum value of 1. A and B are parameters which can be set depending on the desired sensitivity of the confidence map. In particular, A and B determine threshold values for $\sigma_D$ above which the confidence is 0, and below which the confidence is 1. The threshold values for $\sigma_D$ are given by equations (36) and (37):

$$\sigma_D^{min} = \frac{(B-1)}{A} \quad (36)$$

$$\sigma_D^{max} = \frac{B}{A} \quad (37)$$

Another option for confidence is to make it dependent on a percentage error, in which case the confidence depends on the relative error $$\frac{\sigma_D}{D}.$$

The equation for confidence becomes:

$$C_{noise} = \max\left(\min\left(\left(-A\frac{\sigma_D}{D}+B\right), 1\right), 0\right) \quad (38)$$

where a maximum relative error is fixed at $$\left(\frac{\sigma_D}{D}\right)^{max}$$

above which the confidence is zero, and a minimum relative error is fixed at $$\left(\frac{\sigma_D}{D}\right)^{min}$$

below which the confidence is one.

$$\left(\frac{\sigma_D}{D}\right)^{min} = \frac{(B-1)}{A} \quad (39)$$

$$\left(\frac{\sigma_D}{D}\right)^{max} = \frac{B}{A} \quad (40)$$

Once again, the confidence can be set to zero when the depth edge detector is showing that a pixel is at a depth edge.

Finally, a full confidence map is defined as:

$$C = C_{noise} \times C_{depth\ edge} \qquad (41)$$

as a product of the confidence map from the noise and from the depth edges. If there are other factors affecting the confidence, the confidence maps from these other factors can further multiply the confidence map.

As previously discussed, image filtering is a popular tool in depth imaging. A bilateral filter is a non-linear, edge-preserving, and noise-reducing smoothing filter for images. It replaces the intensity of each pixel with a weighted average of intensity values from nearby pixels. This weight can be based on a Gaussian distribution. Crucially, the weights depend not only on Euclidean distance of pixels, but also on the radiometric differences (e.g., range differences, such as color intensity, depth distance, etc.). This preserves sharp edges.

In one or more embodiments, filters are guided by depth and jointly filter the different storage units with consistent weights across the filters applied to the frames of storage units. This ensures consistent filters and avoids adding spurious features to the depth. To that end, a first estimate of the depth is obtained from the unfiltered data.

The depth edge detector can then be used to report the pixels that are straddling a depth edge, and therefore whose depth estimates should not be trusted, as they may be giving a depth that is in between the depth on either side of the edge, when there is no object at that depth. Thus, we immediately get a confidence score for each pixel: if the depth edge detector is reporting that a pixel is at or near an edge, we report a low confidence. If it is far away from a depth edge we report high confidence.

Using the estimate of depth variance, we can update the confidence score to give more information: if either the pixel is very close to a depth edge, or has high depth variance, the confidence score is low. If the pixel is not close to a depth edge and has low depth variance, the confidence score is high. The variance can be an absolute variance $\sigma_D^2$, or a relative variance $$\frac{\sigma_D^2}{D^2},$$

and may include terms due to noise, and terms due to calibration inaccuracies. The confidence score can be used in many applications, such as a situation where multiple cameras are looking at the same scene or parts of the same scene, the operator would consider the high confidence depth estimates to be more trustworthy. Another application is to use the confidence score to apply further filtering, where the weight of each pixel depends on its confidence score. Typically, if a pixel has high confidence it should be given a bigger weight in its contribution to filtered values of pixels around it.

Figure 8A:
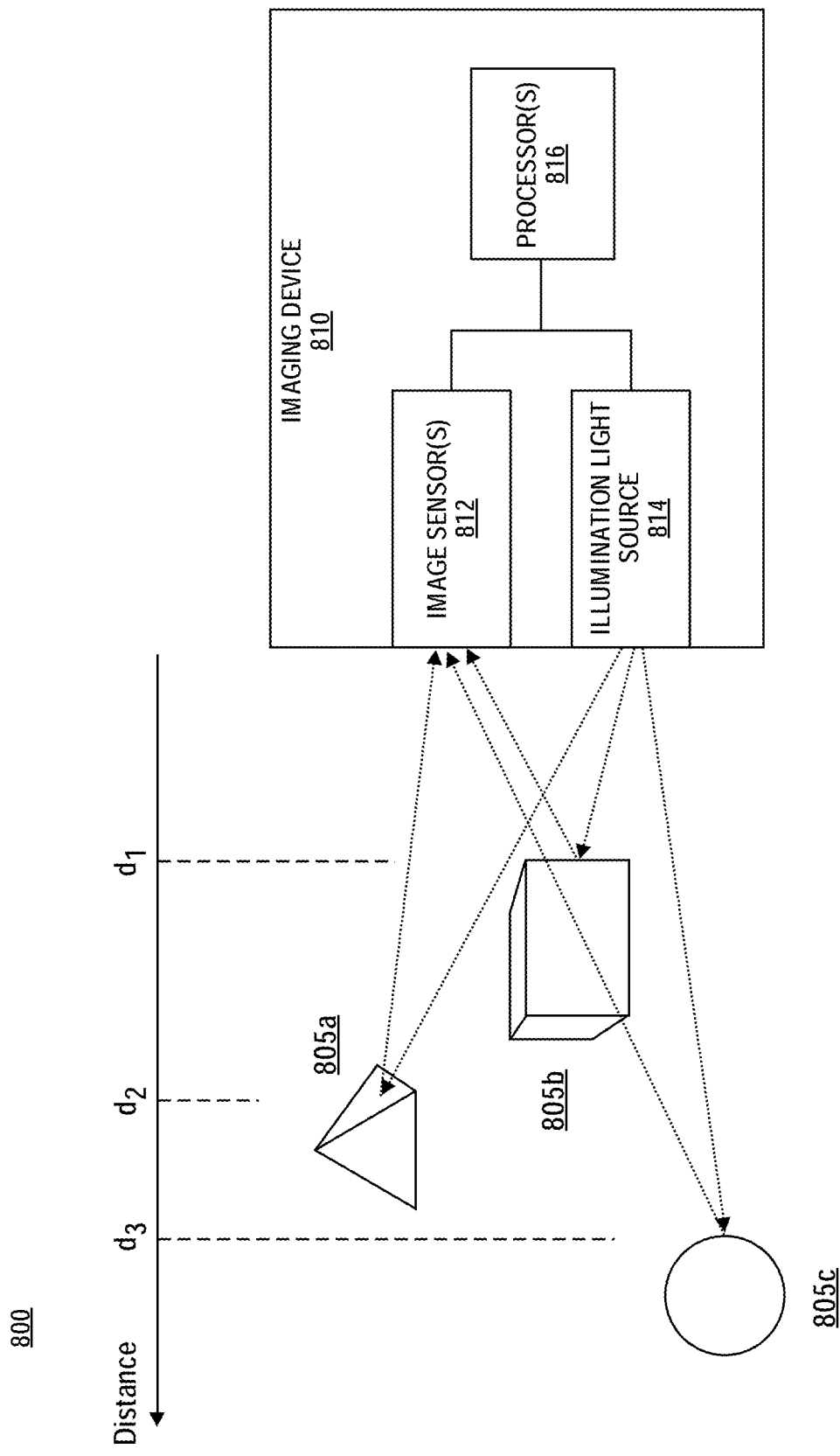
FIG. 8A depicts an illustrative imaging device configured to sense distance, according to some embodiments.

FIG. 8A depicts an illustrative imaging device configured to sense distance, according to some embodiments;

According to some embodiments described herein, distance information may be determined by using an imaging device configured to emit illumination light and to sense illumination light that is reflected back to the device from objects in the environment. In some cases, the same imaging device may additionally capture two-dimensional images of the environment (e.g., using an identical image sensor as was used to sense the reflected illumination light, or otherwise). An illustrative imaging device is depicted in the TOF 3D sensing system 800 of FIG. 8A.

In the example of FIG. 8A, imaging device 810 includes image sensor(s) 812 and an illumination light source 814, both of which are controlled by processor(s) 816. Three illustrative objects 805a, 805b and 805c are positioned distances $d_2$, $d_1$ and $d_3$, respectively, from the imaging device. The illumination light source 814, which can be a laser light source such as a laser diode, emits illumination light (e.g., laser light) which travels outward from the imaging device, is reflected from the objects 805a-805c, and is incident upon the image sensor(s) 812. It will be appreciated that for clarity only those light rays that are both incident upon the objects 805a, 805b, or 805c and reflect to the image sensor(s) are depicted in the figure, and that in general there will be other light rays both emitted from the illumination light source and light rays reflected in directions other than those shown in the figure.

Image sensor(s) 812 may be configured to recognize both visible light and infrared light (e.g., may be a combined RGB and IR sensor). In such cases, the illumination light source may be a source of infrared radiation so that the image sensor(s) 812 can distinguish between simultaneously received infrared radiation (that comprises illumination light reflected from objects in the environment) and visible light (from viewing objects in the environment in the visible spectrum). Image sensor 812 may include any suitable image sensor technology, including but not limited to, Charge Coupled Device (CCD) or Complementary Metal Oxide Semiconductor (CMOS) imaging devices.

In some implementations, image sensor(s) 812 may include a plurality of pixels that collect reflected illumination light for a portion of a scene being viewed by the imaging device. By analyzing the received light, the image sensor can determine, for each pixel, a distance to an object viewed by that pixel. Thus, a "distance map" of a scene may be imaged by the image sensor(s) that is analogous to a conventional two-dimensional (2D) image except that each pixel measures distance instead of light intensity.

Figure 8B:
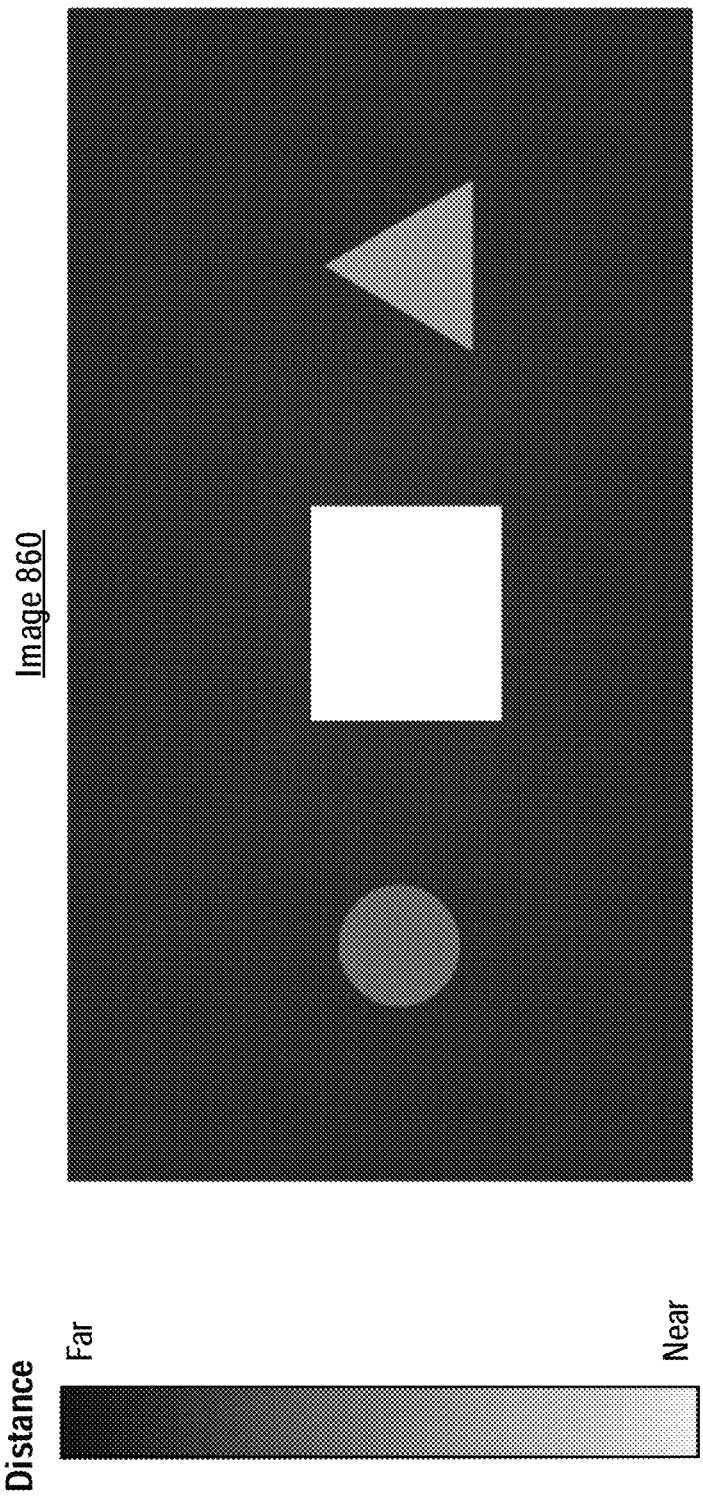
FIG. 8B depicts an illustrative distance map produced by the imaging device shown in FIG. 8A, according to some embodiments.

An illustrative distance map 850 for the scene depicted in FIG. 8A is shown in FIG. 8B, according to some embodiments. In the image 860 shown in FIG. 8B, a pixel is darker the further from the imaging device the sensed object is located. Consequently, a rectangular shape corresponding to object 805b as viewed from the imaging device is measured as relatively close to the imaging device (light gray); a triangular shape corresponding to object 805a as viewed from the imaging device is measured at a middle distance from the imaging device (mid gray); and a circular shape corresponding to object 805c as viewed from the imaging device is measured as relatively far from the imaging device (dark gray).

The illumination light source 814 may consume a significant amount of power to provide light sufficiently strong to reach the objects 805a-805c and be reflected back to the image sensor(s). This power consumption can represent a significant portion of available power of a TOF 3D sensing system, particularly when the TOF 3D sensing system is battery-operated, such as for a portable device.

Applicant has recognized and appreciated that distance sensing may be performed by an imaging device with a higher power efficiency by emitting illumination light in only some, not all, cases in which a distance determination is desired. In those cases, in which illumination light is not emitted by the device, image analysis techniques may be used to estimate distances by comparing 2D images captured by the imaging device and detecting how an object or objects in those images change over time.

According to some embodiments, distances previously determined when illumination light was produced and captured may be used as a reference to aid in estimation of distance using 2D image analysis techniques. For example, illumination light may be emitted periodically to periodically determine distances, and in between those emissions image analysis may be performed to determine distances (e.g., using the previously-determined distances obtained using illumination light as a reference point).

According to some embodiments, a decision of whether to emit illumination light (to determine distances by collecting the reflected illumination light) may be based on an analysis of 2D images. The analysis may determine how accurate an estimation of distance will be based on one or more 2D images, so that when the accuracy falls below an acceptable threshold, a decision may be made to obtain a more accurate determination of distance using illumination light. In this manner, illumination light may be emitted only when a 2D image analysis does not produce acceptably accurate distance measurements, which may reduce the frequency with which the illumination light is emitted, thereby reducing power usage.

While aspects of the present disclosure may be used in any suitable imaging device, there may be particular advantages to applying such aspects within imaging devices that capture light during a plurality of frames, such as in video capture. Some imaging devices may be configured to ultimately preserve a single image yet may capture images a number of times prior to and/or after the image device has been activated to preserve the single image (e.g., devices configured to display a scene prior to capture of a single image for purposes of previewing the still image, and/or devices configured to capture a plurality of images when activated to capture a single image so that a single image can be selected and/or synthesized from the plurality of images). For the purposes of the discussion herein, a "frame" is considered to be applicable to both image capture during: (i) video capture; and (ii) still image capture where multiple images are registered in a device during the still image capture process (including, but not limited to, those examples above).

According to some embodiments, determining whether to emit illumination light based on an analysis of a 2D image may be performed in the same frame during which the 2D image was captured. Making the determination within the same frame may ensure that, in the case it is determined that illumination light is not to be emitted, a 2D image may be captured during the subsequent frame without there being an interim frame in which the determination is be made. Accordingly, the imaging device may operate efficiently by capturing an image during each frame. According to some embodiments, once it is determined that illumination light is to be emitted, the illumination light is emitted during the same frame during which the determination was made. Alternatively, if there is insufficient time during a frame to capture a 2D image, determine whether to emit illumination light and also emit the illumination light (e.g., because the imaging device does not have the processing capacity to perform all these steps within the frame because the frame time is very short and/or due to processing limitations of the device), the emission of illumination light may occur in a subsequent frame.

According to some embodiments, determination of a distance using illumination light, such as laser light from a laser diode, may use a pulse modulation technique. In pulse modulation, illumination light is emitted as a pulse of known duration so that the reflected light pulse can be identified and its time of flight measured (and therefore the distance to an object determined). In some implementations, a pulse modulation technique may operate an image sensor with a plurality of shutters that each capture a segment of the reflected illumination light pulse. The fraction of reflected illumination light that is measured during each shutter may imply the time of flight of the light pulse.

According to some embodiments, determination of a distance using illumination light may use a continuous wave technique. In such a technique, a distance to an object is determined by measuring a phase shift of light reflected from an object. The phase shift is indicative of a distance to the object when a wavelength of the illumination light is known.

Following below are more detailed descriptions of various concepts related to, and embodiments of, techniques of distance sensing. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 9:
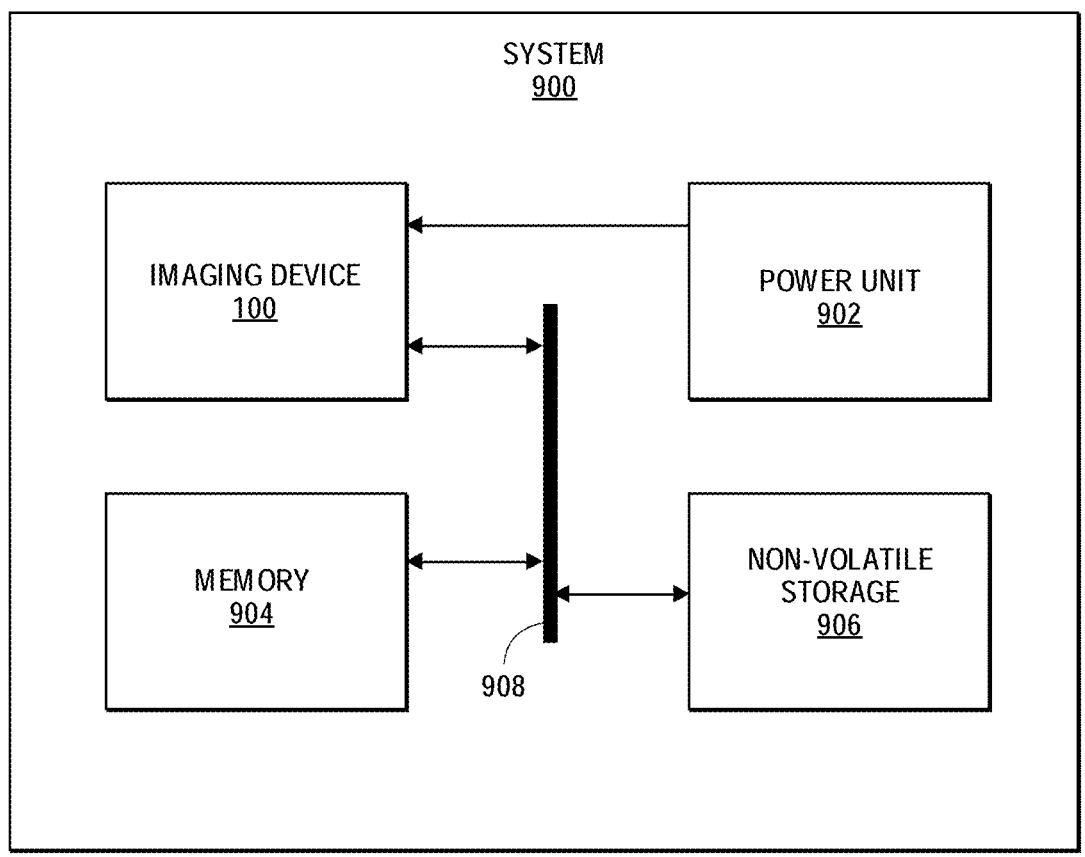
FIG. 9 illustrates an example of system incorporating an imaging device of the type described herein.

FIG. 9 illustrates an example of system incorporating an imaging device of the type described herein. An illustrative implementation of a system 900 which may incorporate an imaging device of the types described herein and shown in FIG. 1. The system 900 includes the imaging device 100 of FIG. 1, although imaging devices according to alternative embodiments described herein may alternatively be included. A power unit 902 may be provided to power the imaging device 100, along with potentially power other components of the system. The power unit 902 may be a battery in some embodiments, such as a battery typically used in mobile phones, tablets, and other consumer electronics products. As has been described, in some embodiments the imaging device 100 may provide low power operation, and thus may facilitate the use of a low power battery as the power unit 902. However, the power unit 902 is not limited to being a battery, nor is it limited to a particular type of battery in all embodiments.

The system 900 further comprises a memory 904 and a non-volatile storage 906. Those components may be communicatively coupled to the imaging device 100 in any suitable manner, such as via a shared communication link 908. The shared communication link 908 may be a bus or other suitable connection. The memory 904 and/or non-volatile storage 906 may store processor-executable instructions for controlling operation of the imaging device 100, and/or data captured by the imaging device 100. In connection with techniques for distance sensing as described herein, code used to, for example, signal an illumination light source to produce one or more light pulses, to open and/or close a shutter of an image sensor, read out pixels of an image sensor, perform distance calculations based on collected illumination light, etc. may be stored on one or more of memory 904 or non-volatile storage 906. Processor 107 may execute any such code to provide any techniques for distance sensing as described herein. Memory 904 may store data representative of 2D and/or 3D images captured by imaging device 100. The memory 904 and/or non-volatile storage 906 may be non-transitory memory in at least some embodiments.

The imaging systems described herein may be used in various applications, some examples of which are described in connection with FIGS. 10-12. A first example is that of a mobile device, such as a smartphone, tablet computer, smartwatch, or other mobile device. The imaging systems of the type described herein, such as the imaging device 100 or system 1000, may be used as a camera component of the mobile device. FIG. to illustrates a mobile device 1000 incorporating an imaging device of the types described herein.

The mobile phone 1000 includes a camera 1002 which may be an imaging device of the types described herein for capturing and generating 3D images, such as imaging device 100. The use of imaging device 100 as camera 1002 may be facilitated by low power consumption operation, such as the manners of operation described herein in connection with the imaging devices according to aspects of the present application. Mobile devices, such as mobile phone 1000, typically operate from battery power, and thus components which consume substantial power can be impractical for use within such devices. Imaging devices of the types described herein, by contrast, may be deployed within such devices in a power efficient manner.

Figure 11:
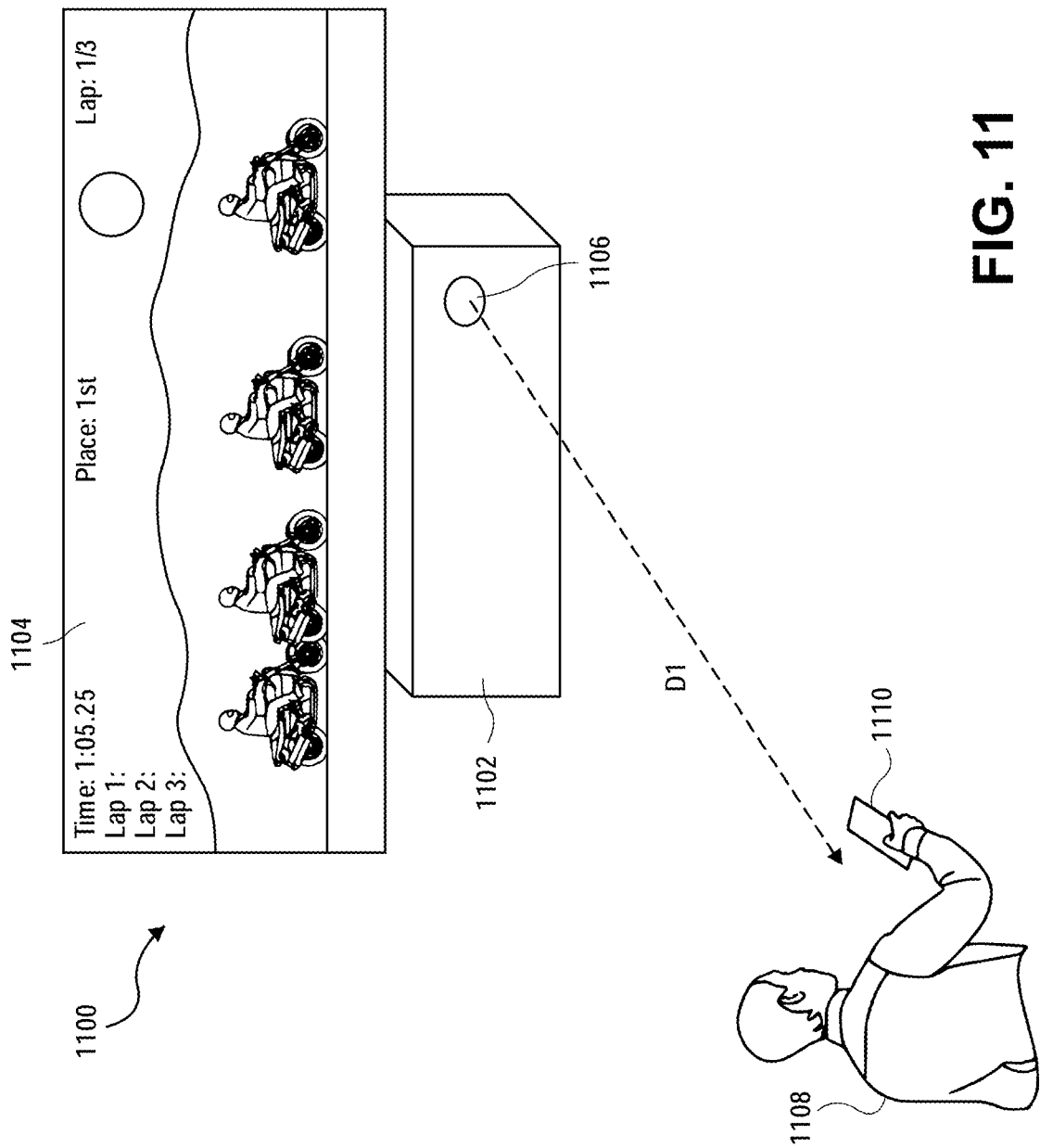
FIG. 11 illustrates a gaming console incorporating an imaging device of the types described herein.

FIG. 11 illustrates an entertainment system 1100 implementing an imaging system of the types described herein. The entertainment system 1100 includes a console 1102 and display 1104. The console may be a video gaming console configured to generate images of a video game on the display 1104, and may include a camera 1106. The camera 1106 may be an imaging system of the types described herein configured to capture 3D images, such as imaging device 100. In the example of FIG. 11, a user 1108 may interact with the entertainment system via a controller 110, for example to play a video game. The camera 1106 may capture images of the user and/or controller, and may determine a distance D1 to the user. The distance information may be used to generate a 3D image for display on the display 1104 or for control of some other aspect of the entertainment system. For example, the user 1102 may control the entertainment system with hand gestures, and the gestures may be determined at least in part through capturing distance information D1.

Imaging systems of the types described herein may also be employed in robotics. FIG. 12 illustrates an example of a robot 1202 with an imaging system 1204. The robot may be mobile and the information collected by imaging system 1204 may be used to assist in navigation and/or motor control of the robot. The imaging system 1204 may be of the types described herein, for example being the system or imaging device 100. Mobile robots are typically powered by batteries, and thus imaging systems of the types described herein which may operate at relatively low power according to at least some of the described embodiments may facilitate their integration with the robot.

Figure 10:
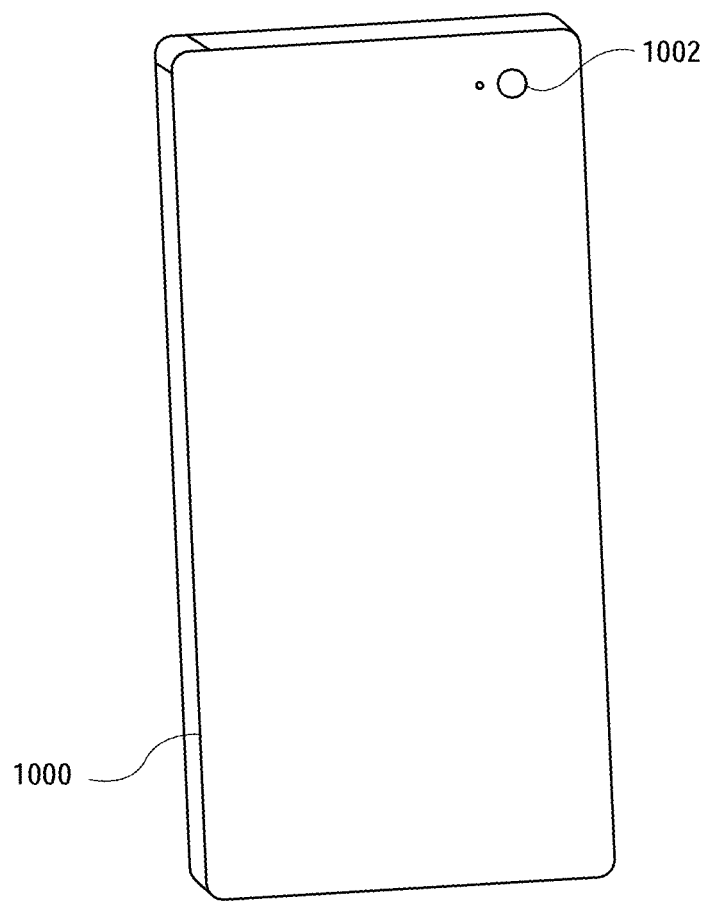
FIG. 10 illustrates a mobile device incorporating an imaging device of the types described herein.
Figure 12:
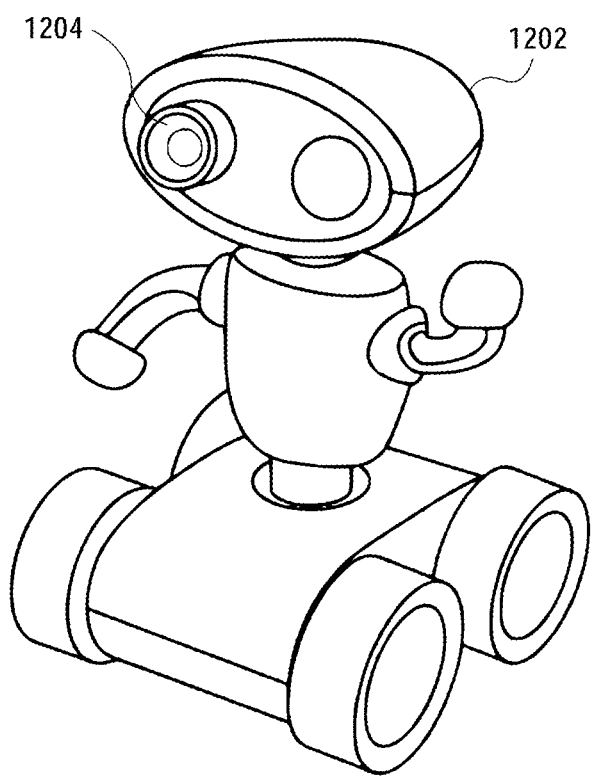
FIG. 12 illustrates a robot incorporating an imaging device of the types described herein.

Examples of uses of the technology described herein beyond those shown in FIGS. 10-12 are also possible. For example, automobiles and security cameras may implement 3D imaging devices of the types described herein.

The phrase "and/or," as used herein in the specification and in the claims, should be understood to mean "either or both" of the elements so conjoined, i.e., elements that are conjunctively present in some cases and disjunctively present in other cases. The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Using Time-of-Flight Depth Sensing with Optimized Time-Varying Light Intensity

A large source of energy consumption for depth sensing using time-of-flight cameras comes from powering the laser(s) that illuminates the scene. To get high signal-to-noise ratio (SNR), the camera sensor is exposed to sufficient amount of light, which currently typically restricts time of flight sensing to plugged-in devices. Many applications require a battery powered solution, such as drone sensing, augmented reality, automotive sensing.

To reduce power consumption with minimal loss in depth image accuracy, this disclosure describes machine learning and computer vision algorithms to enhance low quality depth images obtained from a time-of-flight camera using a low power light source (i.e. by sending fewer light pulses for a given frame). The idea of using low quality depth images obtained from a low power setting to obtain higher quality depth images as if they were collected in a high-power setting by using machine learning techniques is a subset of the more general idea of using machine learning techniques to map data obtained with limited resources (e.g., power, exposure time, pixel count) to data obtained with more abundant resources. One other example is to map low SNR images to what might have been recorded as a high SNR image. Since restriction of such resources probably exhibits itself in a systematic way in the data obtained with limited resources, a data-driven/machine learning approach has the potential to successfully model and compensate such differences if there is enough training data.

To obtain a high-quality depth map, embodiments include using time-insensitive frames (e.g., RGB frames) alongside low quality depth images. As an example, the power consumption of RGB camera is less than the power consumption for laser-based capture of depth images, and the RGB frames can be used to increase the resolution of the depth sensing. Such a system is trained in a data-driven approach such as by a neural net trained to predict the high-quality depth map of the current frame given the current RGB image and a low-quality depth map. To further save power, the system is also trained to output a confidence score that reflects how accurately it can predict the depth in the current frame using the current RGB image and previous depth estimates. When the confidence score is low, such a system can turn on a laser (or other illumination source) and/or use fewer pulses to obtain a low-quality depth map. This low-quality depth map can be used with the RGB image to obtain a higher quality depth map.

In embodiments, the imaging device can take measurements from a scene using the imaging sensor. The term "measurements" can include capturing two-dimensional images and depth images (e.g., depth information that can be used to construct a depth map). The term "two dimensional images" includes any images that are not depth images, such as color (RGB) images, greyscale images, infrared images, other conventional images, etc.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device (which may include the foregoing examples) encoded with one or more programs that, when executed on one or more computers or other processors, implement some of the various embodiments of the present application.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be open-ended, i.e., to mean including but not limited to. The transitional phrases "consisting of" and "consisting essentially of" shall be closed or semi-closed transitional phrases, respectively.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods. In this respect, various inventive concepts may be embodied as a computer readable storage medium or multiple computer readable storage media (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An image processing system that preserves depth edges, comprising:
   a light source configured to emit light during a first time interval;
   an image sensor for collecting incoming signals including reflected light comprising a plurality of pixels, wherein for each of the plurality of pixels, the image sensor includes a set of storage units for storing collected signals;
   a programmable timing generator configured to control the light source and the image sensor, and determine measurements performed and stored at each storage unit of the set of storage units;
   a filter configured to perform depth edge preserving filtering on the collected signals from each of the set of storage units; and
   a processor configured to utilize filtered stored collected signals from the storage units, and determine a distance measurement at each of the plurality of pixels.

2. The system of claim 1, wherein the processor is further configured to determine a depth variance measurement at each of the plurality of pixels.

3. The system of claim 2, further comprising a confidence map for the plurality of pixels,
   wherein the confidence map includes a value for each of the plurality of pixels indicating a reliability of a distance measurement for the respective pixel, and
   wherein the reliability is based at least in part on an expected depth variance for the respective pixel.

4. The system of claim 3, wherein the confidence map is configured to use the expected depth variance at each pixel to generate a confidence value, and wherein the confidence value decreases with increasing expected depth variance;
   and wherein the reliability is based at least in part on a depth edge detector wherein the confidence value decreases with increasing edge presence.

5. The system of claim 1, wherein the processor is further configured to determine an estimate of expected depth variance at each of the plurality of pixels.

6. The system of claim 5, wherein the processor is configured to use an error model to determine the estimate of expected depth variance at each of the plurality of pixels.

7. The system of claim 6, wherein the processor is configured to apply a spatial filter to the measurements stored in each of the storage units, generating spatially filtered measurements.

8. The system of claim 1, wherein a first set of weights is applied to each of the set of storage units.

9. The system of claim 8, wherein the weights spatially decay away from a filtered pixel for the respective storage unit with a spatial variance.

10. The system of claim 1, wherein the filter is a guided filter guided by a depth where a filter strength is equal across the set of storage units.

11. The system of claim 1, further comprising a depth edge detector for the plurality of pixels, wherein the depth edge detector detects depth edges in regions where the filter is filtering weakly.

12. The system of claim 11,
    wherein a first set of weights is applied to each of the set of storage units, and
    wherein the processor is configured to determine the regions where the filter is filtering weakly by summing unnormalized weights of the filter and, when the sum of the unnormalized weights falls below a threshold, determining proximity to an edge.

13. The system of claim 1, wherein the filter is a bilateral filter in space and depth.

14. The system of claim 9, wherein the spatial decay is an approximation of a Gaussian with a variance that depends on a local depth measurement.

15. The system of claim 13, wherein the filter decays in depth according to a decay function that conditionally depends on depth and an estimate of expected variance.

16. The system of claim 15, wherein the decay function is an approximation of a Gaussian with a variance equal to the estimate of expected variance.

17. A method for determining depth edges in an image, comprising:

emitting light during a first time interval;

collecting incoming signals including reflected emitted light at a plurality of pixels and storing collected incoming signals in a set of storage units;

determining a depth estimate for a plurality of pixels from unfiltered collected incoming signals;

determining an estimate of standard deviation of depth for each of the plurality of pixels;

determining, for each of the plurality of pixels, based at least in part on the estimate of standard deviation of depth, whether a respective pixel is close to an edge; and filtering the collected incoming signals from each of the set of storage units associated with each of the plurality of pixels to preserve depth edges; and determining a distance measurement at each of the plurality of pixels based on the filtered stored collected signals from the storage units.

18. The method of claim 17, wherein filtering further comprises:

when the respective pixel is close to an edge, filtering the collected incoming signals from the respective set of storage units associated with the respective pixel weakly, and when the respective pixel is not close to an edge, filtering the collected incoming signals from the respective set of storage units associated with the respective pixel strongly.

19. The method of claim 17, further comprising producing a confidence map for the plurality of pixels, wherein the confidence map includes a value for each pixel indicating a reliability of the depth estimate for the respective pixel, and wherein the reliability is based at least in part on the estimate of standard deviation of depth for the respective pixel.

20. The method of claim 17, wherein filtering includes filtering the collected incoming signals from each of the set of storage units to generate the filtered stored collected signals before determining the distance measurement.

21. An image processing filter that preserves edge depth, comprising:

a light source configured to emit light during a first time interval;

an image sensor for collecting incoming signals including reflected light comprising a plurality of pixels, wherein for each of the plurality of pixels, the image sensor includes a set of storage units for storing collected signals;

a programmable timing generator configured to control the light source and the image sensor;

means for determining measurements performed and stored at each storage unit of the set of storage units;

means for performing depth edge preserving filtering on the collected signals from each of the set of storage units; and means for utilizing filtered stored collected signals from the storage units, and determining a distance measurement at each of the plurality of pixels.

\* \* \* \* \*